US010228813B2

(12) United States Patent
Lowrie et al.

(10) Patent No.: US 10,228,813 B2
(45) Date of Patent: Mar. 12, 2019

(54) SYSTEM AND METHOD FOR REMOTE INTERFACE ALERT TRIGGERING

(71) Applicant: Pearson Education, Inc., New York, NY (US)

(72) Inventors: Alexander W. Lowrie, Davis, CA (US); Raman Huziy, Brisbane, CA (US); Terre M. Passero, Larkspur, CA (US)

(73) Assignee: Pearson Education, Inc., New York, NY (US)

( * ) Notice: Subject to any disclaimer, the term of this patent is extended or adjusted under 35 U.S.C. 154(b) by 300 days.

(21) Appl. No.: 15/055,475

(22) Filed: Feb. 26, 2016

(65) Prior Publication Data
US 2017/0251046 A1    Aug. 31, 2017

(51) Int. Cl.
| | |
|---|---|
| G06F 15/16 | (2006.01) |
| G06F 3/0481 | (2013.01) |
| H04L 29/08 | (2006.01) |
| H04L 12/24 | (2006.01) |

(52) U.S. Cl.
CPC ............ G06F 3/0481 (2013.01); H04L 41/22 (2013.01); H04L 67/306 (2013.01)

(58) Field of Classification Search
CPC ...... G06F 3/0481; H04L 41/22; H04L 67/306
See application file for complete search history.

(56) References Cited

U.S. PATENT DOCUMENTS

| | | | |
|---|---|---|---|
| 6,341,308 B1 | 1/2002 | Yamaguchi | |
| 9,172,721 B2* | 10/2015 | Jain | ..................... H04L 63/1458 |
| 9,426,139 B1 | 8/2016 | McClintock | |
| 9,654,175 B1 | 5/2017 | Lowrie et al. | |
| 9,785,995 B2* | 10/2017 | Malek | ..................... G06N 3/126 |
| 9,813,430 B2* | 11/2017 | Sang | ................... H04L 63/1408 |
| 9,825,991 B2* | 11/2017 | Ivanchykhin | ........... H04L 63/08 |
| 2003/0101245 A1 | 5/2003 | Srinivasan | |
| 2005/0197988 A1* | 9/2005 | Bublitz | ................ G06Q 10/105 706/46 |
| 2008/0052757 A1* | 2/2008 | Gulati | ................. H04L 41/0809 726/1 |
| 2009/0132931 A1* | 5/2009 | Tatsubori | ................ H04L 67/36 715/752 |
| 2010/0287222 A1* | 11/2010 | Wright | ................ H04L 41/0226 707/803 |
| 2010/0287226 A1* | 11/2010 | Wright | .................... H04L 51/36 709/202 |
| 2011/0307233 A1 | 12/2011 | Tseng | |

(Continued)

*Primary Examiner* — Mohamed A Wasel
(74) *Attorney, Agent, or Firm* — Quarles & Brady LLP

(57) ABSTRACT

In a system for triggering generation of an alert for delivery to a remote device, the system can include memory having a user profile database, and a content library database. The system can include a recipient user device having a network interface and a recipient I/O subsystem. The system can include a supervisor device having a network interface and a supervisor I/O subsystem. The system can include a content management server than can direct the generation of a placement interface in the graphical user interface by the recipient I/O subsystem, direct the generation of a presentation interface direct the generation of a coupling interface at each of the recipient user device and the supervisor user device, and generate and send an alert to the recipient user device and the supervisor device.

19 Claims, 16 Drawing Sheets

(56) References Cited

U.S. PATENT DOCUMENTS

| | | |
|---|---|---|
| 2012/0219099 A1 | 8/2012 | Loukianov |
| 2012/0271460 A1 | 10/2012 | Rognli |
| 2012/0296986 A1 | 11/2012 | Hassan |
| 2013/0205323 A1* | 8/2013 | Sinha ............... G06T 1/0021 725/19 |
| 2013/0282438 A1 | 10/2013 | Hunter |
| 2014/0215055 A1* | 7/2014 | Reynolds ............ H04L 43/022 709/224 |
| 2014/0274078 A1 | 9/2014 | Hyde |
| 2014/0304798 A1 | 10/2014 | Iyengar |
| 2014/0308645 A1* | 10/2014 | Chaniotakis ........... G09B 7/077 434/350 |
| 2016/0232515 A1 | 8/2016 | Jhas |
| 2017/0032030 A1* | 2/2017 | Lord ................. H04M 19/04 |

\* cited by examiner

SYSTEM AND METHOD FOR REMOTE INTERFACE ALERT TRIGGERING

BACKGROUND OF THE INVENTION

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

BRIEF SUMMARY

One aspect of the present disclosure relates to a system for triggering generation of an alert for delivery to a remote device. The system includes a memory. The memory can include: a user profile database including information identifying one or several attributes of a recipient user; and a content library database including a plurality of data packets for providing to the recipient user, which data packets include: a plurality of delivery data packets; and a plurality of assessment data packets. The system can include a recipient user device including: a network interface that can exchange data via a communication network; and a recipient I/O subsystem that can convert electrical signals to user interpretable outputs, which recipient I/O subsystem can generate a graphical user interface according to received data. The system can include a supervisor device including: a network interface that can exchange data via the communication network; and a supervisor I/O subsystem that can convert electrical signals to user interpretable outputs user interface, which supervisor I/O subsystem can generate a graphical user interface according to received data. The system can include a content management server. The content management server can: direct the generation of a placement interface in the graphical user interface by the recipient I/O subsystem; direct the generation of a presentation interface in the graphical user interface by the recipient I/O subsystem, which presentation interface is that can implement a delivery sequence. In some embodiments, the delivery sequence includes: delivering a set of delivery data packets to the recipient user device, which set of delivery packets include a subset of the plurality of delivery packets; and delivering an assessment data packet to the recipient user device. The content management server can: direct the generation of a coupling interface at each of the recipient user device and the supervisor user device; and generate and send an alert to the recipient user device and the supervisor device based on one or several electrical signals received from the recipient user device.

In some embodiments, the supervisor device can receive the alert from the content management server and automatically provide alert data in user interpretable outputs via the I/O subsystem in response to receipt of the alert. In some embodiments, the alert data identifies the user associated with the alert and identifies a remedial action for resolving the cause of the alert. In some embodiments, the content management server can: trigger an incrementing timer; compare the incrementing timer to a trigger value; and generate and send the alert when the incrementing timer exceeds the trigger value.

In some embodiments, the content management server can communicatively couple the recipient user device and the supervisor device. In some embodiments, communicatively coupling the recipient user device and the supervisor device includes: automatically sending a proposed time for communicatively coupling of the recipient user device and the supervisor device to the recipient user device; receiving an acceptance signal of the proposed time for communicatively coupling the recipient user device and the supervisor device from the recipient user device; and triggering a decrementing timer based on the receipt of the acceptance signal and the amount of time until the proposed time for communicatively coupling the recipient user device and the supervisor device. In some embodiments, communicatively coupling the recipient user device and the supervisor device further includes receiving an indication of data transmission between the recipient user device and the supervisor device, which indication includes a signal from at least one of the recipient user device and the supervisor device indicating communicative coupling.

In some embodiments, the content management server can direct generation of a dashboard interface in the graphical user interface by the supervisor I/O subsystem. In some embodiments, the content management server can send information for updating the dashboard interface, which information indicates the communicative coupling of the recipient user device and the supervisor device. In some embodiments, the content management server can direct generation of an assessment interface in the graphical user interface by the recipient I/O subsystem, which assessment interface includes a plurality of user prompts and a plurality of user input regions. In some embodiments, the content management server can send the assessment data packet to the recipient user device.

One aspect of the present disclosure relates to a method for triggering an alert for delivery to a remote device. The method includes: generating and sending an electrical signal directing generation of a placement interface in a graphical user interface of a recipient user device by a recipient I/O subsystem; generating and sending an electrical signal directing the generation of a presentation interface in the graphical user interface of the recipient user device by the recipient I/O subsystem, which presentation interface can implement a delivery sequence, which delivery sequence includes: delivering a set of delivery data packets to the recipient user device, which set of delivery packets include a subset of the plurality of delivery packets; and delivering an assessment data packet to the recipient user device. In some embodiments, the method includes: generating and sending an electrical signal directing the generation of a coupling interface at each of the recipient user device and a supervisor user device; and generating and sending an alert to the recipient user device and to the supervisor device based on one or several electrical signals received from the recipient user device.

In some embodiments, the method includes receiving the alert from the content management server at the supervisor device and automatically providing alert data in user interpretable outputs via the I/O subsystem in response to receipt of the alert. In some embodiments, the alert data identifies the user associated with the alert and identifies a remedial action for resolving the cause of the alert.

In some embodiments, the method includes: triggering an incrementing timer; comparing the incrementing timer to a trigger value; and generating and sending the alert when the incrementing timer exceeds the trigger value. In some embodiments, the method can include: automatically sending a proposed time for communicatively coupling of the recipient user device and the supervisor device to the recipient user device; receiving an acceptance signal of the proposed time for communicatively coupling the recipient user device and the supervisor device from the recipient user device; and triggering a decrementing timer based on the receipt of the acceptance signal and the amount of time until the proposed time for communicatively coupling the recipient user device and the supervisor device.

In some embodiments, the method can include receiving an indication of data transmission between the recipient user device and the supervisor device, which indication includes a signal from at least one of the recipient user device and the supervisor device indicating communicative coupling. In some embodiments, the method includes directing generation of an assessment interface in the graphical user interface by the recipient I/O subsystem, which assessment interface includes a plurality of user prompts and a plurality of user input regions. In some embodiments, the method includes sending the assessment data packet to the recipient user device.

One aspect of the present disclosure relates to a system for triggering generation of an alert for delivery to a remote device. The system includes: memory including: a user profile database including information identifying one or several attributes of a recipient user; and a content library database including a plurality of data packets for providing to the recipient user, which data packets include: a plurality of delivery data packets; and a plurality of assessment data packets. The system includes a recipient user device including: a network interface that can exchange data via a communication network; and an I/O subsystem that can convert electrical signals to user interpretable outputs user interface. The system includes a supervisor device including: a network interface that can exchange data via the communication network; and an I/O subsystem that can convert electrical signals to user interpretable outputs user interface. The system includes a content management server. The content management server can: receive an electrical signal from the recipient user device, which electrical signal includes a request for initiation of a delivery sequence, which delivery sequence includes: delivering of a set of delivery data packets to the recipient user device, which set of delivery packets include a subset of the plurality of delivery packets; communicatively coupling of the recipient user device and the supervisor device; and delivering an assessment data packet to the recipient user device. The content management server can: trigger an incrementing timer based on receipt of the electrical signal from the recipient user device; sequentially deliver the set of delivery data packets to the recipient user device; receive a response from the recipient user device after delivery of each of the set of delivery data packets; automatically send a proposed time for communicatively coupling the recipient user device and the supervisor device to the recipient user device; receive an acceptance signal of the proposed time for communicatively coupling the recipient user device and the supervisor device from the recipient user device; trigger a decrementing timer based on the receipt of the acceptance signal and the amount of time until the proposed time for communicatively coupling the recipient user device and the supervisor device; compare the incrementing timer to a trigger value; and generate and send an alert based on the comparison of the incrementing timer and the trigger value.

In some embodiments, the supervisor device can receive the alert from the content management server and automatically provide alert data in user interpretable outputs via the I/O subsystem in response to receipt of the alert. In some embodiments, the alert data identifies the user associated with the alert and identifies a remedial action for resolving the cause of the alert. In some embodiments, the alert is generated and sent when the timer exceeds the trigger value.

In some embodiments, a next one of the set of delivery data packets is sequentially delivered after a response to a previously delivered one of the set of delivery data packets is received from the recipient user device. In some embodiments, the central server can associate a value indicative of completion with each delivery data packet subsequent to receipt of the response to that delivery data packet. In some embodiments, the content management server can update the user profile database with the value indicative of completion.

In some embodiments, the content management server can generate and send a signal to the recipient user device and to the supervisor device directing the output of a representation of the decrementing timer. In some embodiments, the content management server can generate and send a task packet to the recipient user device, which task packet includes data identifying circumstances and a user action for the identified circumstances. In some embodiments, the content management server can send the assessment data packet to the recipient user device. In some embodiments, the recipient user device can generate an assessment interface in response to receipt of the assessment data packet, which assessment interface includes a plurality of user prompts and a plurality of user input regions.

One aspect of the present disclosure relates to a method for triggering an alert for delivery to a remote device. The method includes: receiving an electrical signal from a recipient user device, which electrical signal includes a request for initiation of a delivery sequence, which delivery sequence includes: delivering of a set of delivery data packets to the recipient user device, which set of delivery packets include a subset of a plurality of delivery packets; communicatively coupling of the recipient user device and a supervisor device; and delivering an assessment data packet to the recipient user device. The method can include: triggering an incrementing timer based on receipt of the electrical signal from the recipient user device; sequentially delivering the set of delivery data packets to the recipient user device; receiving a response from the recipient user device after delivery of each of the set of delivery data packets; automatically sending a proposed time for communicatively coupling the recipient user device and the supervisor device to the recipient user device; receiving an acceptance signal of the proposed time for communicatively coupling the recipient user device and the supervisor device from the recipient user device; triggering a decrementing timer based on the receipt of the acceptance signal and the amount of time until the proposed time for communicatively coupling the recipient user device and the supervisor device; comparing the incrementing timer to a trigger value; and generating and sending an alert based on the comparison of the incrementing timer and the trigger value.

In some embodiments, the alert includes code to direct the supervisor device to provide an indicator of the received alert. In some embodiments, the indicator of the received alert includes one of: an aural indicator; a tactile indicator; and a visual indicator. In some embodiments, the alert is generated and sent when the timer exceeds the trigger value. In some embodiments, a next one of the set of delivery data packets is sequentially delivered after a response to a previously delivered one of the set of delivery data packets is received from the recipient user device.

In some embodiments, the method can include associating a value indicative of completion with each delivery data packet subsequent to receipt of the response to that delivery data packet. In some embodiments, the method can include generating and sending a signal to the recipient user device and to the supervisor device directing the output of a representation of the decrementing timer. In some embodiments, the method can include generating and sending a task packet to the recipient user device, which task packet includes data identifying circumstances and a user action for the identified circumstances. In some embodiments, the method includes sending the assessment data packet to the recipient user device.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
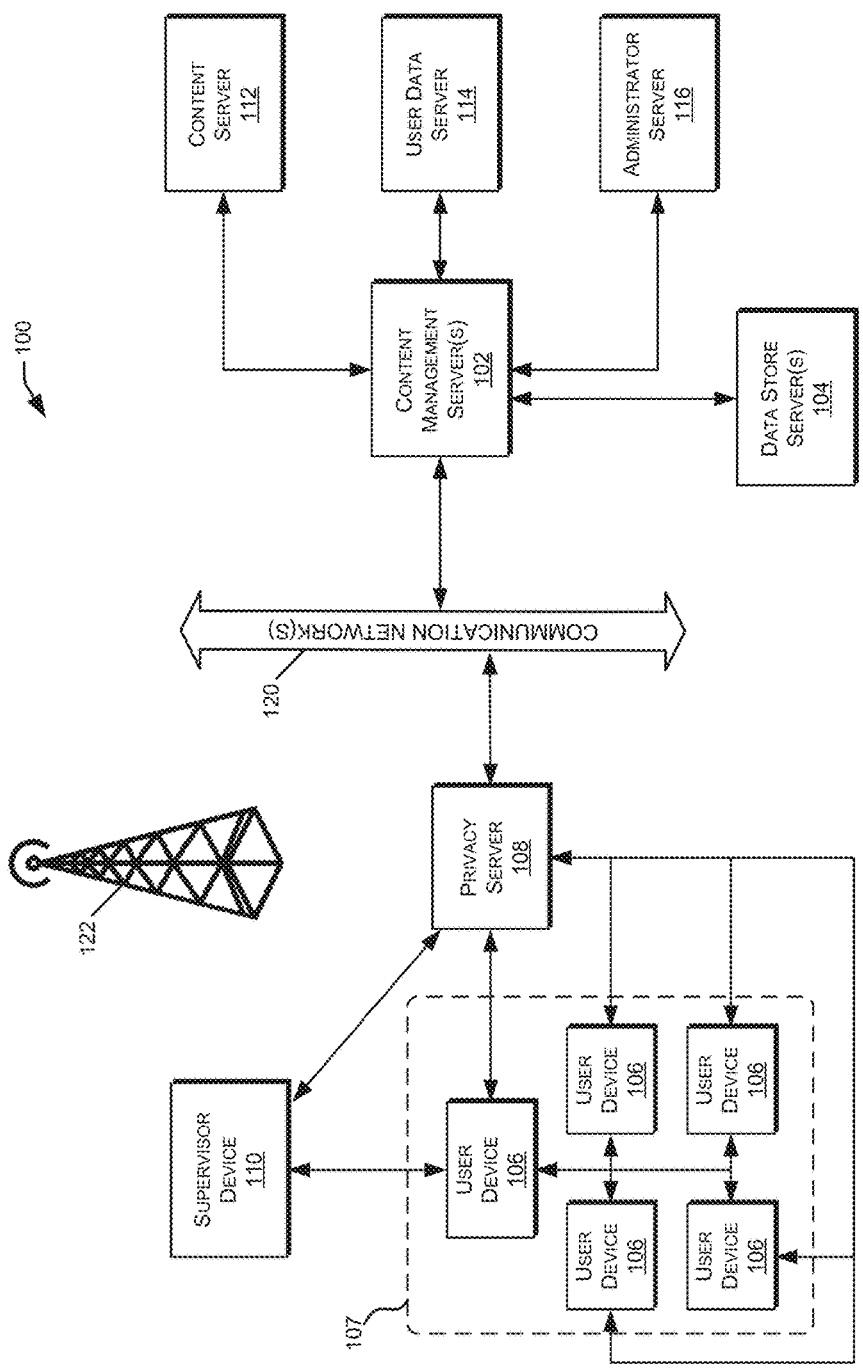
FIG. 1 is a block diagram showing illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks.

These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provides access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

The content distribution network 100 may include one or several navigation systems or features including, for example, the Global Positioning System ("GPS"), GALILEO, or the like, or location systems or features including, for example, one or several transceivers that can determine location of the one or several components of the content distribution network 100 via, for example, triangulation. All of these are depicted as navigation system 122.

In some embodiments, navigation system 122 can include or several features that can communicate with one or several components of the content distribution network 100 including, for example, with one or several of the user devices 106 and/or with one or several of the supervisor devices 110. In some embodiments, this communication can include the transmission of a signal from the navigation system 122 which signal is received by one or several components of the content distribution network 100 and can be used to determine the location of the one or several components of the content distribution network 100.

Figure 2:
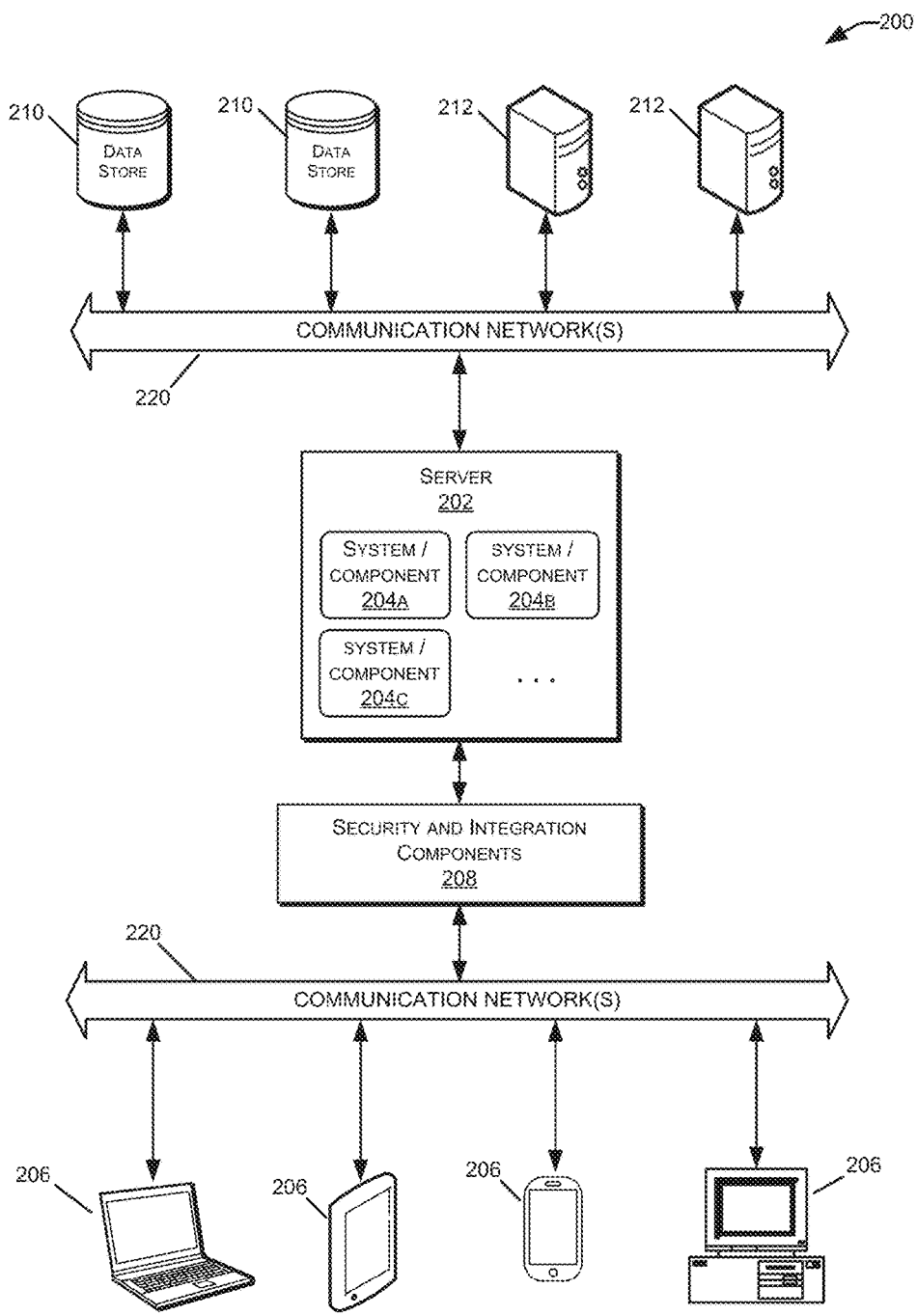
FIG. 2 is a block diagram illustrating a computer server and computing environment within a content distribution network.

With reference to FIG. 2, an illustrative distributed computing environment 200 is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
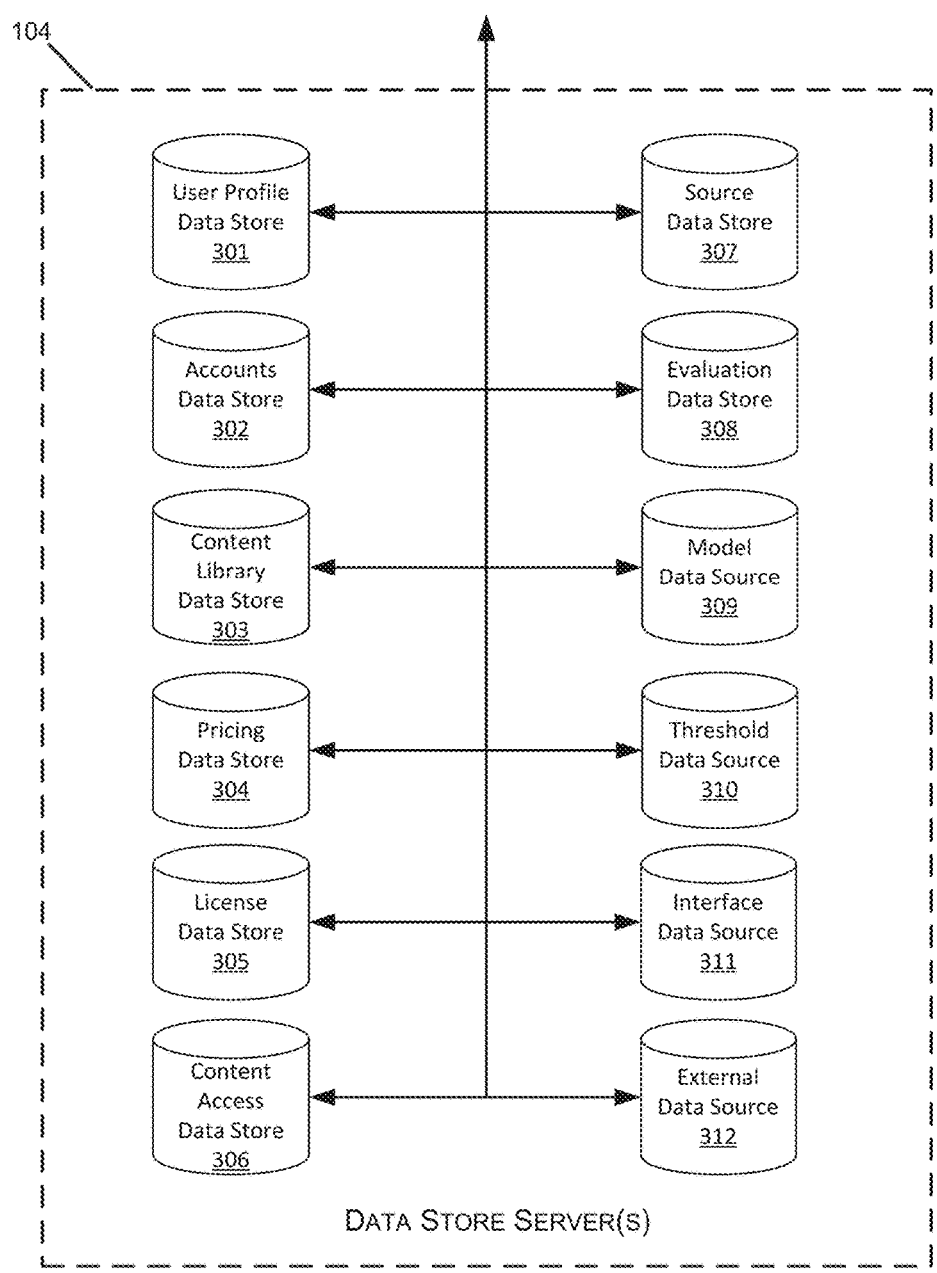
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-312 may reside in storage on a single computer server 104 (or a single server farm or cluster) under the control of a single entity, or may reside on separate servers operated by different entities and/or at remote locations. In some embodiments, data stores 301-312 may be accessed by the content management server 102 and/or other devices and servers within the network 100 (e.g., user devices 106, also referred to herein as recipient user devices 106, supervisor devices 110, administrator servers 116, etc.). Access to one or more of the data stores 301-312 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-312, including their functionality and types of data stored therein, are illustrative and non-limiting. Data stores server architecture, design, and the execution of specific data stores 301-312 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. These users can include users of one or several user devices 106, referred to herein as recipient users, and/or user of one or several supervisor devices 110, referred to herein as supervisor users. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments, the user profile database 301 can include information relating to a user's status, location, or the like. This information can identify, for example, a device a user is using, the location of that device, or the like. In some embodiments, this information can be generated based on any location detection technology including, for example, a navigation system 122, or the like.

Information relating to the user's status can identify, for example, logged-in status information that can indicate whether the user is presently logged-in to the content distribution network 100 and/or whether the log-in-is active. In some embodiments, the information relating to the user's status can identify whether the user is currently accessing content and/or participating in an activity from the content distribution network 100.

In some embodiments, information relating to the user's status can identify, for example, one or several attributes of the user's interaction with the content distribution network 100, and/or content distributed by the content distribution network 100. This can include data identifying the user's interactions with the content distribution network 100, the content consumed by the user through the content distribution network 100, or the like. In some embodiments, this can include data identifying the type of information accessed through the content distribution network 100 and/or the type of activity performed by the user via the content distribution network 100, the lapsed time since the last time the user accessed content and/or participated in an activity from the content distribution network 100, or the like. In some embodiments, this information can relate to a content program comprising an aggregate of data, content, and/or activities, and can identify, for example, progress through the content program, or through the aggregate of data, content, and/or activities forming the content program. In some embodiments, this information can track, for example, the amount of time since participation in and/or completion of one or several types of activities, the amount of time since communication with one or several supervisors and/or supervisor devices 110, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100. In some embodiments, this information can include one or several response packets provided by students in response to one or several data packets. In some embodiments, for example, the students user profile may include a plurality of response packets provided by that student in response to one or several data packets. In some embodiments, these response packets can be associated with information relating to the data packet and/or relating to the response such as, for example, the amount of time used by the student in providing the response, the evaluation result in response, or the like.

The user profile database 301 can include information relating to one or several student learning preferences. In some embodiments, for example, the user, also referred to herein as the student or the student-user may have one or several preferred learning styles, one or several most effective learning styles, and/or the like. In some embodiments, the student's learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources or data packets) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

In some embodiments, the one or several data packets can include, for example, data packets for conveying information to a user, also referred to herein as delivery data packets or delivery content items, and data packets to assess a knowledge level, comfort and/or confidence level with a task, and/or skill level of the user, also referred to as assessment data packets or assessment content items. These data packets can include one or several character strings, text, images, audio, video, or the like. In some embodiments, data packets to convey information to the user can include one or several demonstrations, lectures, readings, lessons, videos or video clips, recordings, audio clips, or the like, and in some embodiments, the data packets to assess a knowledge level and/or skill level of the user can include one or several questions including, for example, one or several short answer questions, essay questions, multiple choice questions, true/false questions, survey questions, self-assessment questions, or the like. In some embodiments, the data packets to convey information can be stored in the content database of the data packet database, and in some embodiments, the data packets to assess the knowledge level and/or skill level of the user can be stored in the question database of the data packet database.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics, also referred to herein as evaluation schedules or scoring guides, for use in the evaluation of the content, users, or applications. In some embodiments, the evaluation schedule can include a plurality of partitions each of which can correspond to a performance outcome. In some embodiments, each of the partitions can be associated with a text string identifying criteria of a response packet matching that partition and/or attributes of a response packet matching that partition. The evaluation data store 308 also may include past evaluations and/or evaluation analyses for users, content, and applications, including relative rankings, characterizations, explanations, and the like.

A model data store 309, also referred to herein as a model database 309 can store information relating to one or several predictive models. In some embodiments, these can include one or several evidence models, risk models, or the like. In some embodiments, an evidence model can be a mathematically-based statistical model. The evidence model can be based on, for example, Item Response Theory (IRT), Bayesian Network (Bayes net), Performance Factor Analysis (PFA), or the like. The evidence model can, in some embodiments, be customizable to a user and/or to one or several content items. Specifically, one or several inputs relating to the user and/or to one or several content items can be inserted into the evidence model. These inputs can include, for example, one or several measures of user skill level, one or several measures of content item difficulty and/or skill level, or the like. The customized evidence model can then be used to predict the likelihood of the user providing desired or undesired responses to one or several of the content items.

In some embodiments, the risk models can include one or several models that can be used to calculate one or several model functions values. In some embodiments, these one or several model function values can be used to calculate a risk probability, which risk probability can characterize the risk of a user such as a student-user failing to achieve a desired outcome such as, for example, failing to achieve a desired level of completion of a program, for example in a predefined time period. In some embodiments, the risk probability can identify the risk of the student-user failing to complete 60% of the program.

In some embodiments, these models can include a plurality of model functions including, for example, a first model function, a second model function, a third model function, and a fourth model function. In some embodiments, some or all of the model functions can be associated with a portion of the program such as, for example a completion stage and/or completion status of the program. In one embodiment, for example, the first model function can be associated with a first completion status, the second model function can be associated with a second completion status, the third model function can be associated with a third completion status, and the fourth model function can be associated with a fourth completion status. In some embodiments, these completion statuses can be selected such that some or all of these completion statuses are less than the desired level of completion of the program. Specifically, in some embodiments, these completion status can be selected to all be at less than 60% completion of the program, and more specifically, in some embodiments, the first completion status can be at 20% completion of the program, the second completion status can be at 30% completion of the program, the third completion status can be at 40% completion of the program, and the fourth completion status can be at 50% completion of the program. Similarly, any desired number of model functions can be associated with any desired number of completion statuses.

In some embodiments, a model function can be selected from the plurality of model functions based on a student-user's progress through a program. In some embodiments, the student-user's progress can be compared to one or several status trigger thresholds, each of which status trigger thresholds can be associated with one or more of the model functions. If one of the status triggers is triggered by the student-user's progress, the corresponding one or several model functions can be selected.

The model functions can comprise a variety of types of models and/or functions. In some embodiments, each of the model functions outputs a function value that can be used in calculating a risk probability. This function value can be calculated by performing one or several mathematical operations on one or several values indicative of one or several user attributes and/or user parameters, also referred to herein as program status parameters. In some embodiments, each of the model functions can use the same program status parameters, and in some embodiments, the model functions can use different program status parameters. In some embodiments, the model functions use different program status parameters when at least one of the model functions uses at least one program status parameter that is not used by others of the model functions.

In some embodiments, the model database 309 can include one or several evaluation models. In some embodiments, these evaluation models can generate an evaluation of a response packet based on the presence or absence of one or several patterns in the response packet. In some embodiments, for example, these one or several patterns can be indicated as present or absent in the response packet by one or several Boolean values associated with the response packet. In some embodiments, these one or several evaluation models can be generated and/or trained as discussed below.

In some embodiments, the model database 309 can include one or several sets of data for use in generating and/or training a model. In some embodiments, these one or several sets of data for use in generating and/or training a model, also referred to herein as one or several training sets, can include, for example, a plurality of response packets received in response to one or several data packets. In some embodiments, these one or several response packets can be associated with the valuation information indicating the result of an evaluation already performed on the response packets by, for example, a human evaluator. In some embodiments, these one or several response packets forming the one or several training sets can be received from one or several user devices 106.

A threshold database 310, also referred to herein as a threshold database, can store one or several threshold values. These one or several threshold values can delineate between states or conditions. In one exemplary embodiment, for example, a threshold value can delineate between an acceptable user performance and an unacceptable user performance, between content appropriate for a user and content that is inappropriate for a user, between risk levels, or the like.

An interface data store 311, also referred to herein as an interface database 311 can include information for controlling the operation of a user interface such as a graphical user interface. In some embodiments, this information can include the code for generating the user interface, for adding the desired functionalities, widgets, and/or tools to the user interface, or the like.

In some embodiments, the pattern database 312 can include information associated with one or several response packets, and specifically information identifying one or several patterns as present or absent in one or several response packets. In one embodiment, for example, the pattern database can include data associated with a response packet. This data can, via one or several values such as Boolean values, identify the presence or absence of one or several patterns in the associated response packet. In one embodiment, for example, this data can include a first Boolean value identifying a pattern associated with the Boolean value as present in the response packet, and/or a second Boolean value identifying a pattern associated with the Boolean value as absent in the response packet.

In addition to the illustrative data stores described above, data store server(s) 104 (e.g., database servers, file-based storage servers, etc.) may include one or more external data aggregators 312. External data aggregators 312 may include third-party data sources accessible to the content management network 100, but not maintained by the content management network 100. External data aggregators 312 may include any electronic information source relating to the users, content resources, or applications of the content distribution network 100. For example, external data aggregators 312 may be third-party data stores containing demographic data, education related data, consumer sales data, health related data, and the like. Illustrative external data aggregators 312 may include, for example, social networking web servers, public records data stores, learning management systems, educational institution servers, business servers, consumer sales data stores, medical record data stores, etc. Data retrieved from various external data aggregators 312 may be used to verify and update user account information, suggest user content, and perform user and content evaluations.

Figure 4A:
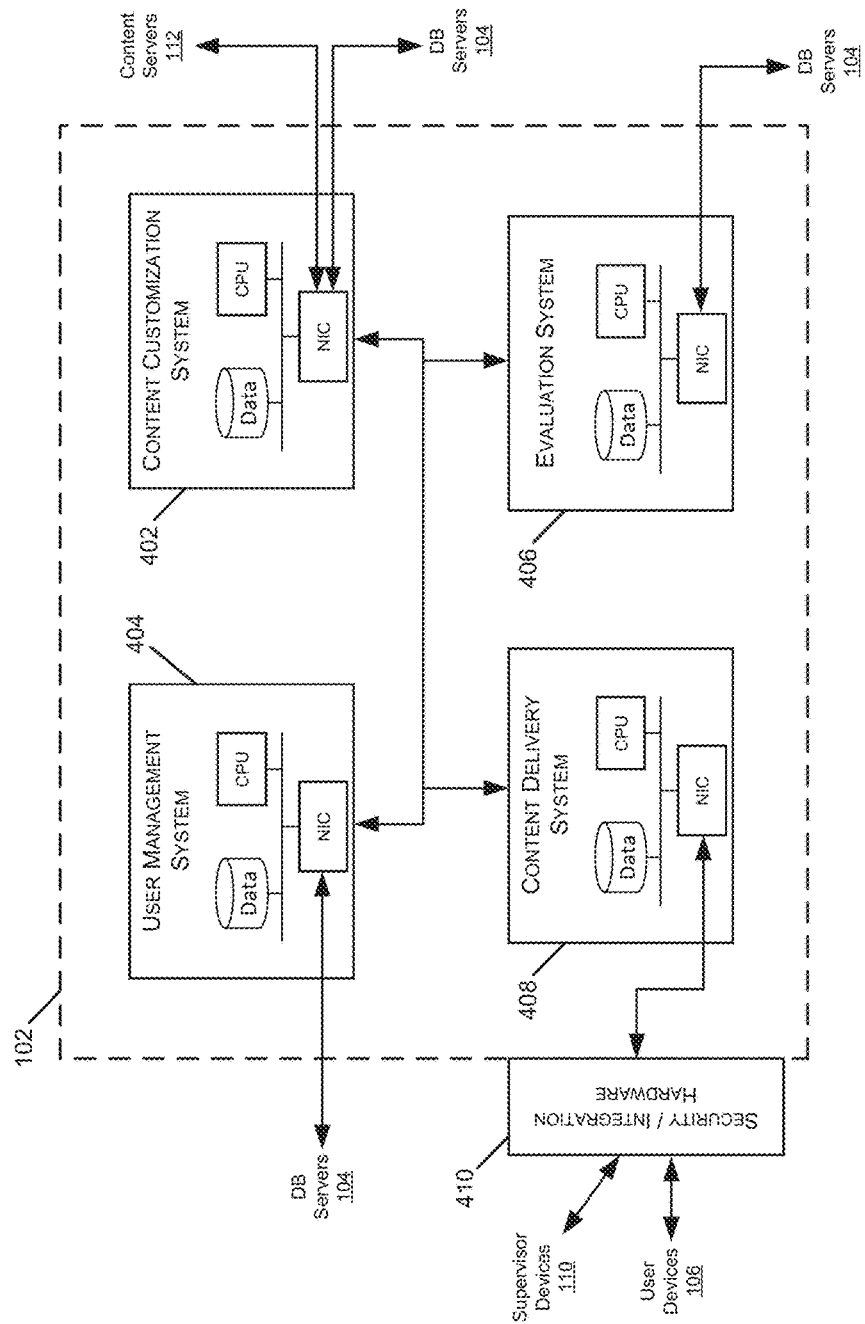
FIG. 4A is a block diagram illustrating an embodiment of one or more content management servers within a content distribution network.

With reference now to FIG. 4A, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

In some embodiments, the content management system 402 can include a recommendation engine, also referred to herein as an adaptive recommendation engine. In some embodiments, the recommendation engine can select one or several pieces of content, also referred to herein as data packets, for providing to a user. These data packets can be selected based on, for example, the information retrieved from the database server 104 including, for example, the user profile database 301, the content library database 303, the model database 309, or the like. In one embodiment, for example, the recommendation engine can retrieve information from the user profile database 301 identifying, for example, a skill level of the user. The recommendation engine can further retrieve information from the content library database 303 identifying, for example, potential data packets for providing to the user and the difficulty of those data packets and/or the skill level associated with those data packets.

The recommendation engine can use the evidence model to generate a prediction of the likelihood of one or several users providing a desired response to some or all of the potential data packets. In some embodiments, the recommendation engine can pair one or several data packets with selection criteria that may be used to determine which packet should be delivered to a student-user based on one or several received responses from that student-user. In some embodiments, one or several data packets can be eliminated from the pool of potential data packets if the prediction indicates either too high a likelihood of a desired response or too low a likelihood of a desired response. In some embodiments, the recommendation engine can then apply one or several selection criteria to the remaining potential data packets to select a data packet for providing to the user. These one or several selection criteria can be based on, for example, criteria relating to a desired estimated time for receipt of response to the data packet, one or several content parameters, one or several assignment parameters, or the like.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406, also referred to herein as a response processor. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

In some embodiments, the evaluation system 406 can be further configured to receive one or several responses from the user and to determine whether the one or several response are correct responses, also referred to herein as desired responses, or are incorrect responses, also referred to herein as undesired responses. In some embodiments, one or several values can be generated by the evaluation system 406 to reflect user performance in responding to the one or several data packets. In some embodiments, these one or several values can comprise one or several scores for one or several responses and/or data packets.

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 can include a presentation engine that can be, for example, a software module running on the content delivery system.

The content delivery system 408, also referred to herein as the presentation module or the presentation engine, may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 4B:
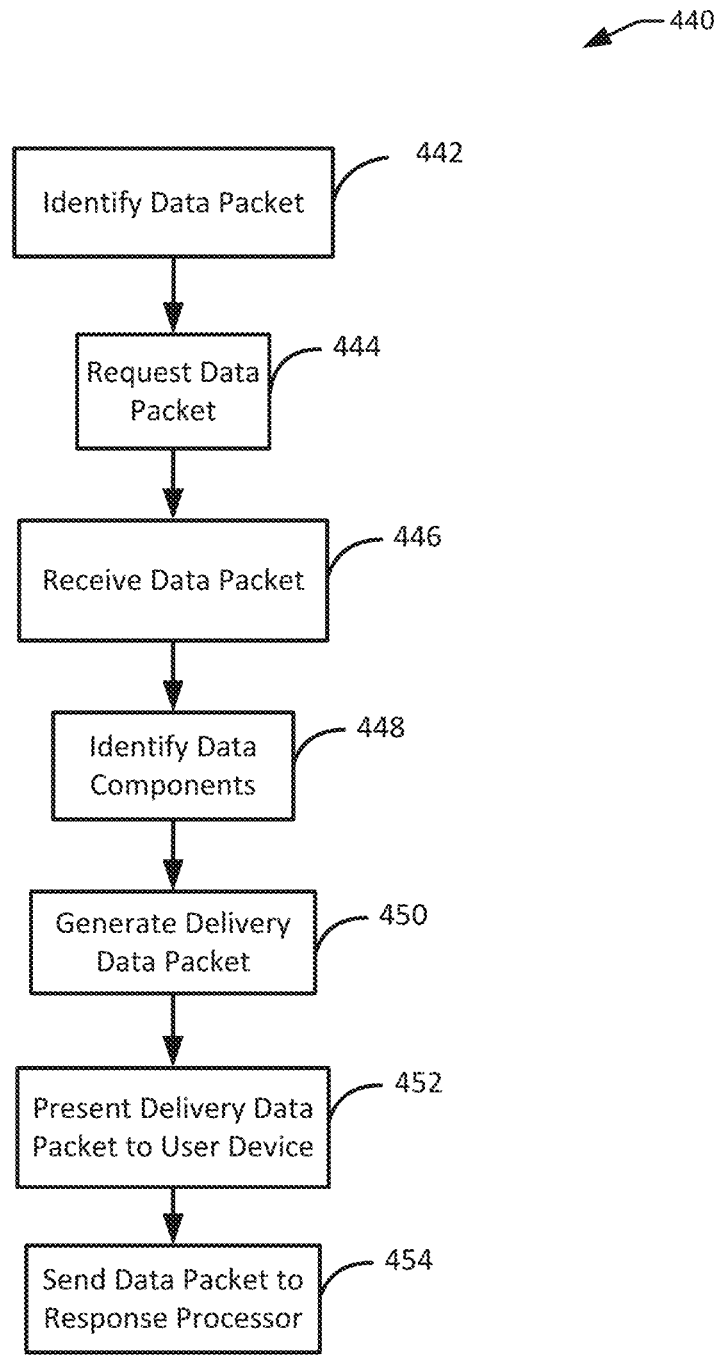
FIG. 4B is a flowchart illustrating one embodiment of a process for data management.

With reference now to FIG. 4B, a flowchart illustrating one embodiment of a process 440 for data management is shown. In some embodiments, the process 440 can be performed by the content management server 102, and more specifically by the content delivery system 408 and/or by the presentation module or presentation engine. The process 440 begins at block 442, wherein a data packet is identified. In some embodiments, the data packet can be a data packet for providing to a student-user, and the data packet can be identified by determining which data packet to next provide to the user such as the student-user. In some embodiments, this determination can be performed by the content customization system 402 and/or the recommendation engine.

After the data packet has been identified, the process 440 proceeds to block 444, wherein the data packet is requested. In some embodiments, this can include the requesting of information relating to the data packet such as the data forming the data packet. In some embodiments, this information can be requested from, for example, the content library database 303. After the data packet has been requested, the process 440 proceeds to block 446, wherein the data packet is received. In some embodiments, the data packet can be received by the content delivery system 408 from, for example, the content library database 303.

After the data packet has been received, the process 440 proceeds to block 448, wherein one or several data components are identified. In some embodiments, for example, the data packet can include one or several data components which can, for example, contain different data. In some embodiments, one of these data components, referred to herein as a presentation component, can include content for providing to the student user, which content can include one or several requests and/or questions and/or the like. In some embodiments, one of these data components, referred to herein as a response component, can include data used in evaluating one or several responses received from the user device 106 in response to the data packet, and specifically in response to the presentation component and/or the one or several requests and/or questions of the presentation component. Thus, in some embodiments, the response component of the data packet can be used to ascertain whether the user has provided a desired response or an undesired response.

After the data components have been identified, the process 440 proceeds to block 450, wherein a delivery data packet is identified. In some embodiments, the delivery data packet can include the one or several data components of the data packets for delivery to a user such as the student-user via the user device 106. In some embodiments, the delivery packet can include the presentation component, and in some embodiments, the delivery packet can exclude the response packet. After the delivery data packet has been generated, the process 440 proceeds to block 452, wherein the delivery data packet is presented to the user device 106. In some embodiments, this can include providing the delivery data packet to the user device 106 via, for example, the communication network 120.

After the delivery data packet has been provided to the user device, the process 440 proceeds to block 454, wherein the data packet and/or one or several components thereof is sent to and/or provided to the response processor. In some embodiments, this sending of the data packet and/or one or several components thereof to the response processor can include receiving a response from the student-user, and sending the response to the student-user to the response processor simultaneous with the sending of the data packet and/or one or several components thereof to the response processor. In some embodiments, for example, this can include providing the response component to the response processor. In some embodiments, the response component can be provided to the response processor from the content delivery system 408.

Figure 4C:
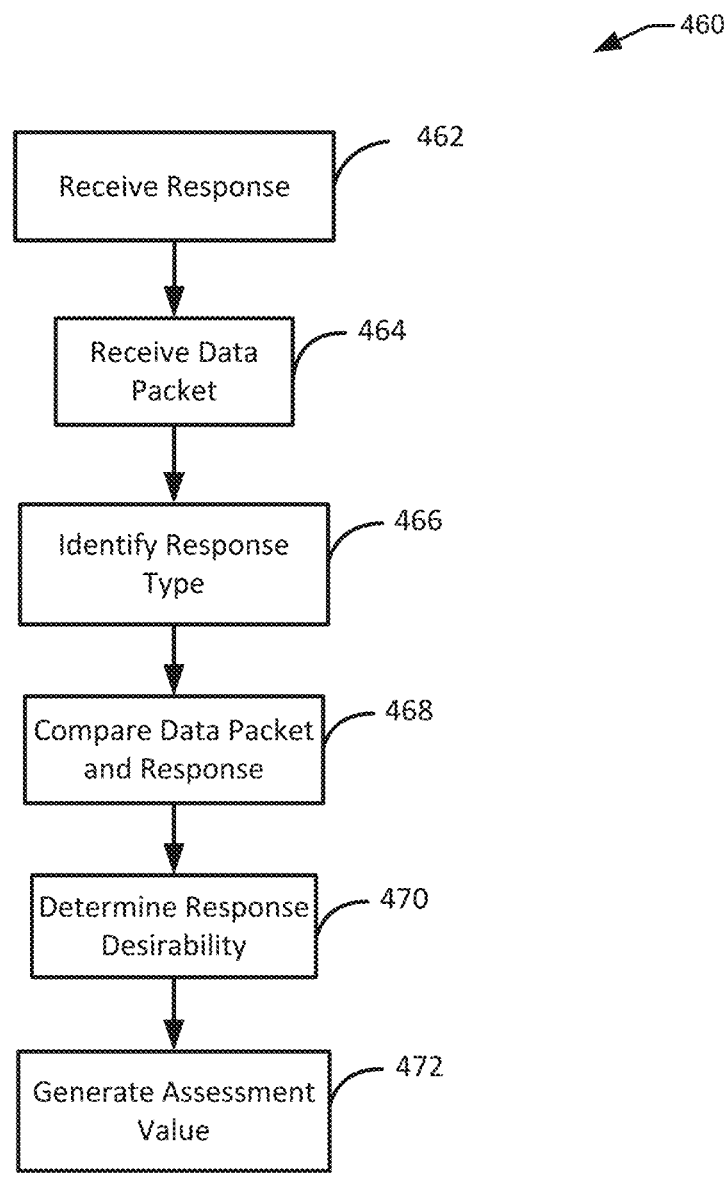
FIG. 4C is a flowchart illustrating one embodiment of a process for evaluating a response.

With reference now to FIG. 4C, a flowchart illustrating one embodiment of a process 460 for evaluating a response is shown. In some embodiments, the process can be performed by the evaluation system 406. In some embodiments, the process 460 can be performed by the evaluation system 406 in response to the receipt of a response from the user device 106.

The process 460 begins at block 462, wherein a response, also referred to herein as a response packet, is received from, for example, the user device 106 via, for example, the communication network 120. After the response has been received, the process 460 proceeds to block 464, wherein the data packet associated with the response is received. In some embodiments, this can include receiving all or one or several components of the data packet such as, for example, the response component of the data packet. In some embodiments, the data packet can be received by the response processor from the presentation engine.

After the data packet has been received, the process 460 proceeds to block 466, wherein the response type is identified. In some embodiments, this identification can be performed based on data, such as metadata associated with the response. In other embodiments, this identification can be performed based on data packet information such as the response component.

In some embodiments, the response type can identify one or several attributes of the one or several requests and/or questions of the data packet such as, for example, the request and/or question type. In some embodiments, this can include identifying some or all of the one or several requests and/or questions as true/false, multiple choice, short answer, essay, or the like.

After the response type has been identified, the process 460 proceeds to block 468, wherein the data packet and the response are compared to determine whether the response comprises a desired response and/or an undesired response. In some embodiments, this can include comparing the received response and the data packet to determine if the received response matches all or portions of the response component of the data packet, to determine the degree to which the received response matches all or portions of the response component, to determine the degree to which the receive response embodies one or several qualities identified in the response component of the data packet, or the like. In some embodiments, this can include classifying the response according to one or several rules. In some embodiments, these rules can be used to classify the response as either desired or undesired. In some embodiments, these rules can be used to identify one or several errors and/or misconceptions evidenced in the response. In some embodiments, this can include, for example: use of natural language processing software and/or algorithms; use of one or several digital thesauruses; use of lemmatization software, dictionaries, and/or algorithms; or the like.

After the data packet and the response have been compared, the process 460 proceeds to block 470 wherein response desirability is determined. In some embodiments this can include, based on the result of the comparison of the data packet and the response, whether the response is a desired response or is an undesired response. In some embodiments, this can further include quantifying the degree to which the response is a desired response. This determination can include, for example, determining if the response is a correct response, an incorrect response, a partially correct response, or the like. In some embodiments, the determination of response desirability can include the generation of a value characterizing the response desirability and the storing of this value in one of the databases 104 such as, for example, the user profile database 301. After the response desirability has been determined, the process 460 proceeds to block 472, wherein an assessment value is generated. In some embodiments, the assessment value can be an aggregate value characterizing response desirability for one or more a plurality of responses. This assessment value can be stored in one of the databases 104 such as the user profile database 301.

Figure 5:
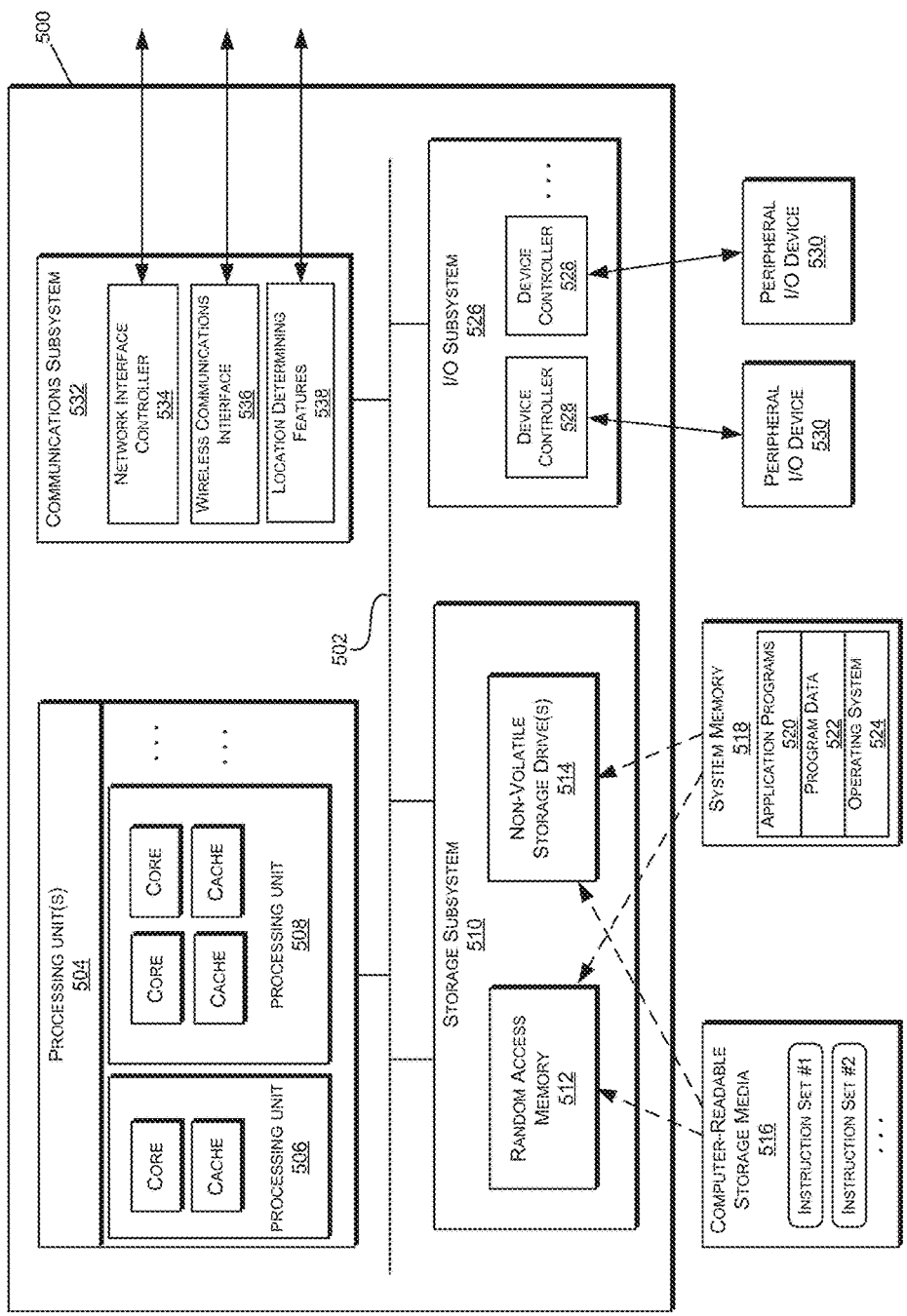
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like. In some embodiments, the I/O subsystem 526 can be configured to generate a user interface such as a graphical user interface (GUI). In some embodiments, a I/O subsystem 526 of a user device 106 is identified as a user I/O subsystem and/or a recipient I/O subsystem. In some embodiments, a I/O subsystem 526 of a supervisor device is identified herein as a supervisor I/O subsystem.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. As illustrated in FIG. 5, the communications subsystem 532 may include, for example, one or more location determining features 538 such as one or several navigation system features and/or receivers, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 312). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
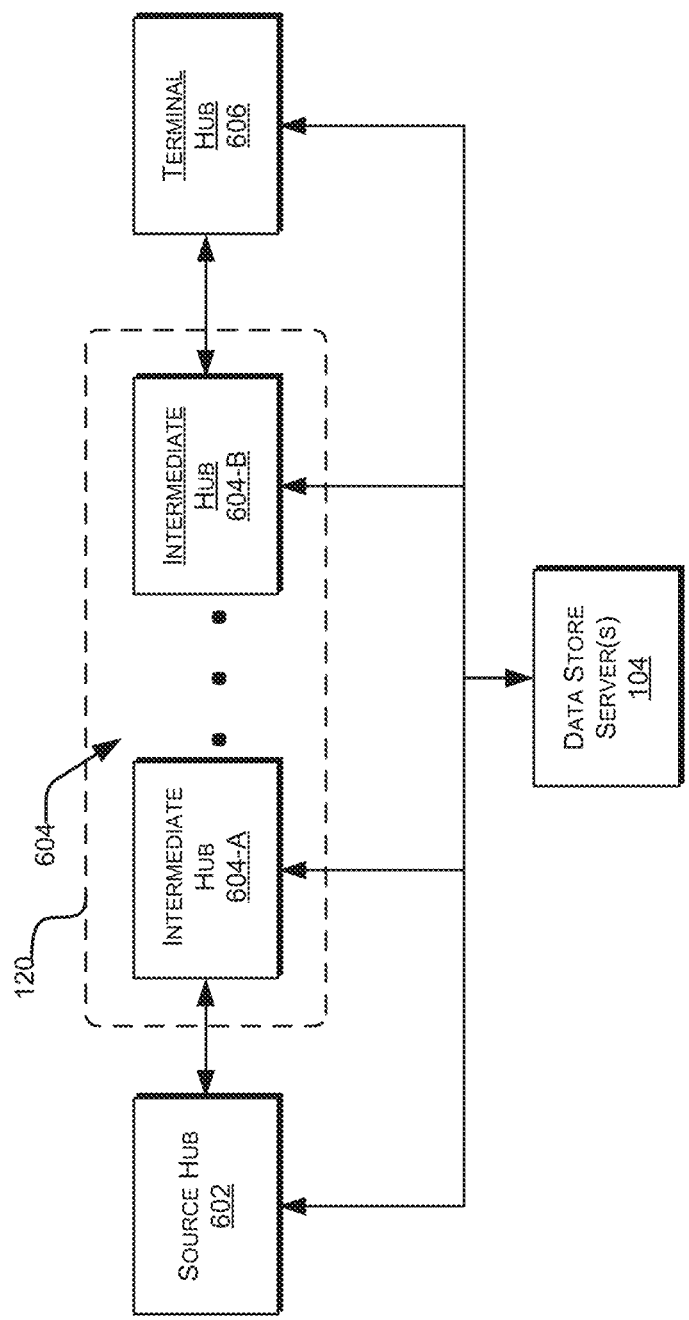
FIG. 6 is a block diagram illustrating one embodiment of the communication network.

With reference now to FIG. 6, a block diagram illustrating one embodiment of the communication network is shown. Specifically, FIG. 6 depicts one hardware configuration in which messages are exchanged between a source hub 602 via the communication network 120 that can include one or several intermediate hubs 604. In some embodiments, the source hub 602 can be any one or several components of the content distribution network generating and initiating the sending of a message, and the terminal hub 606 can be any one or several components of the content distribution network 100 receiving and not re-sending the message. In some embodiments, for example, the source hub 602 can be one or several of the user device 106, the supervisor device 110, and/or the server 102, and the terminal hub 606 can likewise be one or several of the user device 106, the supervisor device 110, and/or the server 102. In some embodiments, the intermediate hubs 604 can include any computing device that receives the message and resends the message to a next node.

As seen in FIG. 6, in some embodiments, each of the hubs 602, 604, 606 can be communicatingly connected with the data store 104. In such embodiments, some or all of the hubs 602, 604, 606 can send information to the data store 104 identifying a received message and/or any sent or resent message. This information can, in some embodiments, be used to determine the completeness of any sent and/or received messages and/or to verify the accuracy and completeness of any message received by the terminal hub 606.

In some embodiments, the communication network 120 can be formed by the intermediate hubs 604. In some embodiments, the communication network 120 can comprise a single intermediate hub 604, and in some embodiments, the communication network 120 can comprise a plurality of intermediate hubs. In one embodiment, for example, and as depicted in FIG. 6, the communication network 120 includes a first intermediate hub 604-A and a second intermediate hub 604-B.

Figure 7:
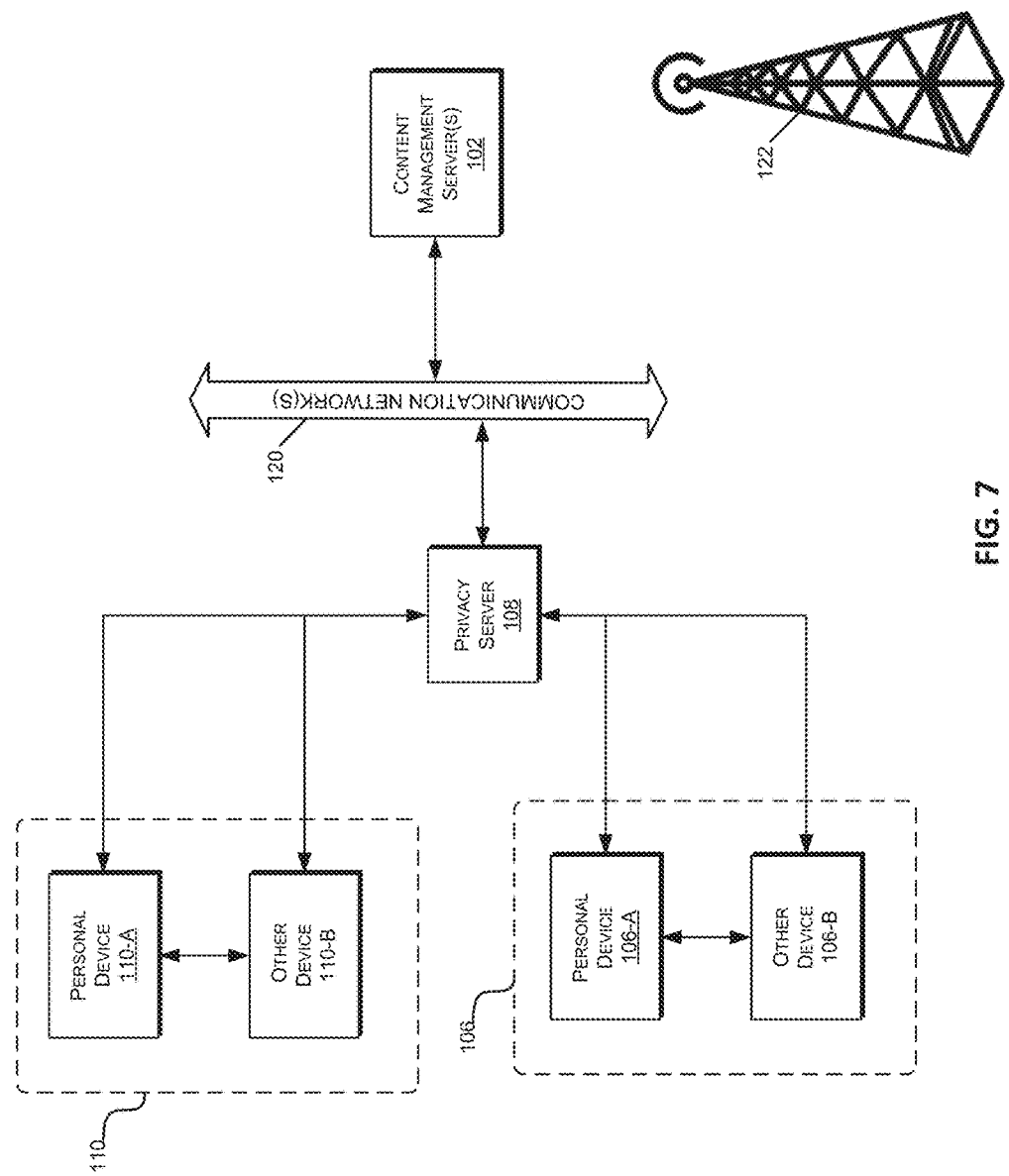
FIG. 7 is a block diagram illustrating one embodiment of user device and supervisor device communication.

With reference now to FIG. 7, a block diagram illustrating one embodiment of user device 106 and supervisor device 110 communication is shown. In some embodiments, for example, a user may have multiple devices that can connect with the content distribution network 100 to send or receive information. In some embodiments, for example, a user may have a personal device such as a mobile device, a Smartphone, a tablet, a Smartwatch, a laptop, a PC, or the like. In some embodiments, the other device can be any computing device in addition to the personal device. This other device can include, for example, a laptop, a PC, a Smartphone, a tablet, a Smartwatch, or the like. In some embodiments, the other device differs from the personal device in that the personal device is registered as such within the content distribution network 100 and the other device is not registered as a personal device within the content distribution network 100.

Specifically with respect to FIG. 7, the user device 106 can include a personal user device 106-A and one or several other user devices 106-B. In some embodiments, one or both of the personal user device 106-A and the one or several other user devices 106-B can be communicatingly connected to the content management server 102 and/or to the navigation system 122. Similarly, the supervisor device 110 can include a personal supervisor device 110-A and one or several other supervisor devices 110-B. In some embodiments, one or both of the personal supervisor device 110-A and the one or several other supervisor devices 110-B can be communicatingly connected to the content management server 102 and/or to the navigation system 122.

In some embodiments, the content distribution network can send one or more alerts to one or more user devices 106 and/or one or more supervisor devices 110 via, for example, the communication network 120. In some embodiments, the receipt of the alert can result in the launching of an application within the receiving device, and in some embodiments, the alert can include a link that, when selected, launches the application or navigates a web-browser of the device of the selector of the link to page or portal associated with the alert.

In some embodiments, for example, the providing of this alert can include the identification of one or several user devices 106 and/or student-user accounts associated with the student-user and/or one or several supervisor devices 110 and/or supervisor-user accounts associated with the supervisor-user. After these one or several devices 106, 110 and/or accounts have been identified, the providing of this alert can include determining an active device of the devices 106, 110 based on determining which of the devices 106, 110 and/or accounts are actively being used, and then providing the alert to that active device.

Specifically, if the user is actively using one of the devices 106, 110 such as the other user device 106-B and the other supervisor device 110-B, and/or accounts, the alert can be provided to the user via that other device 106-B, 110-B and/or account that is actively being used. If the user is not actively using an other device 106-B, 110-B and/or account, a personal device 106-A, 110-A device, such as a smart phone or tablet, can be identified and the alert can be provided to this personal device 106-A, 110-A. In some embodiments, the alert can include code to direct the default device to provide an indicator of the received alert such as, for example, an aural, tactile, or visual indicator of receipt of the alert.

In some embodiments, the recipient device 106, 110 of the alert can provide an indication of receipt of the alert. In some embodiments, the presentation of the alert can include the control of the I/O subsystem 526 to, for example, provide an aural, tactile, and/or visual indicator of the alert and/or of the receipt of the alert. In some embodiments, this can include controlling a screen of the supervisor device 110 to display the alert, data contained in alert and/or an indicator of the alert.

Figure 8:
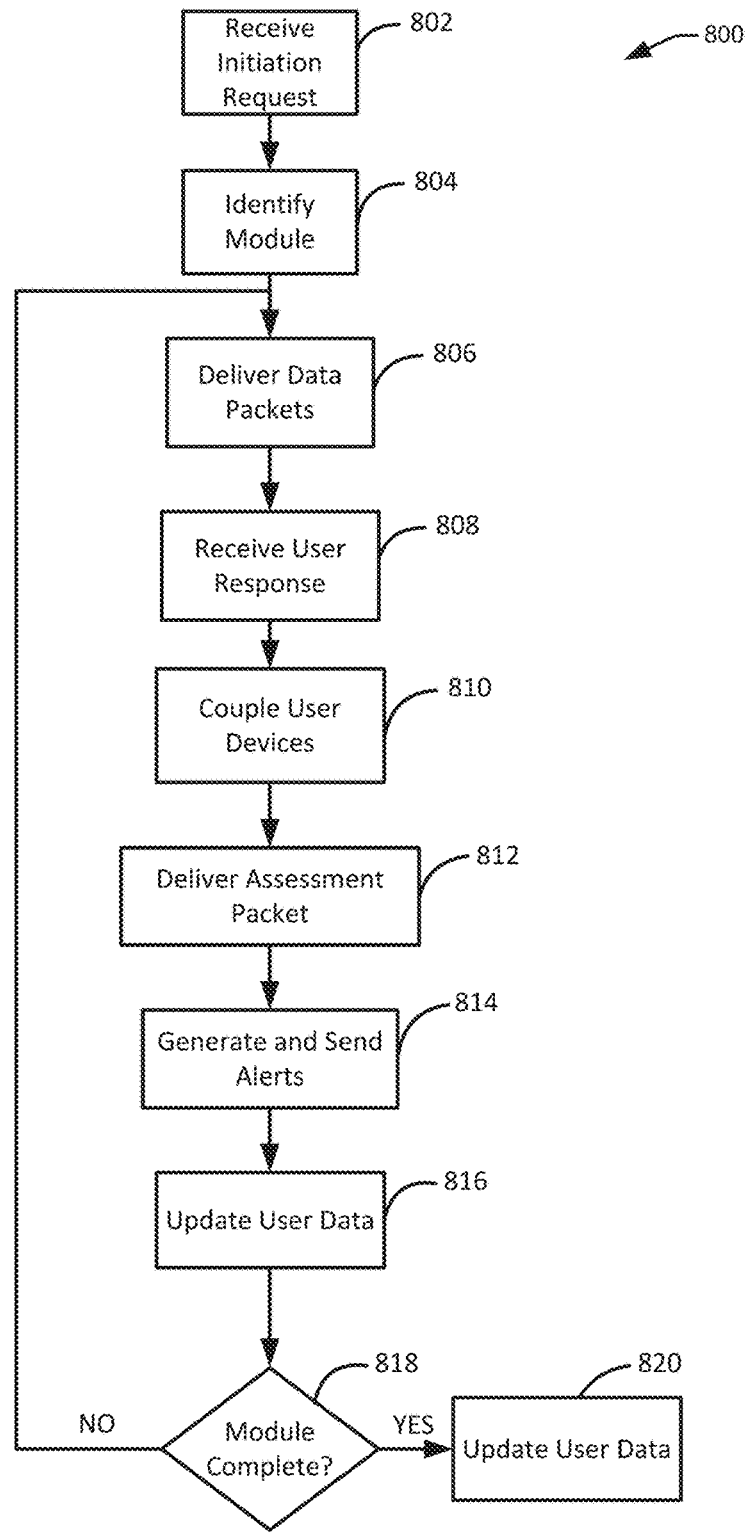
FIG. 8 is a flowchart illustrating one embodiment of process for generating alerts in response to a detected action of a recipient user device.

With reference now to FIG. 8, a flowchart illustrating one embodiment of process 800 for generating alerts in response to a detected action of a recipient user device is shown. The process 800 can be performed by the content distribution network 100, and specifically by some or all of the components of the content distribution network 100. The process 800 begins at block 802, wherein an initiation request is received. In some embodiments, the initiation request can be received from the recipient user device 106 by, for example, the content management server 102 via the communication network 120. The initiation request can comprise an electrical signal including a request for starting of a module, which module can be a group of data packets, tasks, and/or interactions.

After the initiation request has been received, the process 800 proceeds to block 804, wherein the module is identified. In some embodiments, the identification of the module can include, for example, the determining the skill level of the user of the recipient user device 106. In some embodiments, this skill level can be determined based on information stored in the database server 104 such as, for example, the user profile database 301.

In some embodiments, this stored information can be generated based on one or several past or previous interactions between the user and one or several components of the content distribution network 100. In some embodiments, the identification of the module can include determining the module corresponding to the users skill level via one or several assessments, surveys, or the like. In some embodiments, this can include the generating and sending of one or several electrical signals from the server 102 to the recipient user device 106 directing the recipient user device 106, and specifically directing the I/O subsystem of the recipient user device 106 to generate a placement interface in the graphical user interface. In some embodiments, the placement interface can comprise one or several windows or areas for questions or requests and/or one or several windows or areas for receiving one or several response from the user of the recipient user device 106.

In some embodiments, the placement interface can output one or several signals that can be evaluated by, for example, the server 102 to determine the skill level of the user of the recipient user device 106. In some embodiments, after the skill level of the user has been determined, the module corresponding to the skill level can be selected and/or the module corresponding to the skill level and one or several user preferences can be selected.

After the module has been identified and/or selected, the process 800 proceeds to block 806, wherein one or several delivery data packets are provided to the user. In some embodiments, these one or several delivery data packets can be provided by the server 102 to the recipient user device 106 via the communication network 120. Specifically, in some embodiments, the server 102 can generate and send one or several electrical signals directing the recipient user device 106, and particularly directing the I/O subsystem of the recipient user device 106, to generate a presentation interface. In some embodiments, the presentation interface can include a region for presenting information relating to a user's progress through a module, a region including one or several timers or clocks indicating the amount of time since the start of the module or the receipt of a data packet in the module, and/or indicating, in decrementing fashion, the amount of time until an event such as, for example, a until the communicative coupling of the recipient user device 106 to a supervisor device 110 for a live session in which the user of the recipient device 106 and the user of the supervisor device 110 can directly communicate.

In some embodiments, these data packets can comprise the data packets forming the module. In some embodiments, the data packets can be delivered serially according to, for example, a pre-determined order. In some embodiments, the data packets can be retrieved from the database server 104, and specifically from the content library database 303, and can be delivered to the recipient user device 106 for providing to the recipient user.

In some embodiments, an incrementing timer can be triggered when a first one of the delivery data packets is provided to the recipient user device 106, and in some embodiments, this incrementing timer can be triggered at another point in process 800. In some embodiments, the incrementing timer can be located at the server and can be triggered by an electrical signal received at the server 102 by the recipient user device 106. In some embodiments, this incrementing timer can track the amount of time lapsed since its triggering, and more specifically can be used to track the amount of lapsed time since the start of the module.

After, or simultaneous with the providing of the delivery data packets, the process 800 proceeds to block 808, wherein a user response is received, and specifically, wherein a user response is received in response to the receipt of at least one of the data packets. In some embodiments, the user response can be received by the server 102 from the recipient user device 106 via the communication network 120. In some embodiments in which the delivery data packets are serially provided to the recipient user device 106, a response to a provided delivery data packet can be received before an addition delivery data packet is provided to the recipient user device. 106.

After the user response has been received, the process 800 proceeds to block 810, wherein the recipient user device 106 is coupled with a supervisor device 110. In some embodiments, this can be the communicative coupling of these devices 106, 110, which communicative couple can allow the interaction of the user of the recipient user device 106 and the user of the supervisor device 110. In some embodiments, the communicative coupling of these devices 106, 110 can include the server 102 generating and sending one or several electrical signals directing the recipient user device 106 and the supervisor device 110, and particularly directing the I/O subsystems of the recipient user device 106 and of the supervisor device 110, to generate a coupling interface. In some embodiments, the coupling interface can include one or several features configured to facilitate an interactive meeting between the user of the recipient user device 106 and the user of the supervisor device 110. In some embodiments, these features can include, for example, one or several windows or regions configured to show an image of the users such as, for example, a live image of the users, one or several windows or regions configured to show content such as content relating the interactive session, or the like.

In some embodiments, communicatively coupling the devices 106, 110 can include, automatically sending a proposed time for communicatively coupling of the recipient user device and the supervisor device from the server 102 to one or both of the devices 106, 110. In some embodiments, communicatively coupling the devices 106, 110 can include receiving an acceptance signal of the proposed time for communicatively coupling the recipient user device 106 and the supervisor device 110 from one or both of the recipient user device 106 and the supervisor device 110, and triggering a decrementing timer based on the receipt of the acceptance signal and the amount of time until the proposed time for communicatively coupling the recipient user device and the supervisor device. In some embodiments, this decrementing timer can be maintained at the server 102 and can be triggered by receipt of a confirmation of the proposed time for communicatively coupling the devices 106, 110. In some embodiments, this decrementing timer can be visually displayed at one or both of the devices 106, 110. In some embodiments, communicatively coupling the devices 106, 110 can include receiving an indication of data transmission between the recipient user device 106 and the supervisor device 110. In some embodiments, this indication can include a signal from at least one of the recipient user device 106 and the supervisor device 110 indicating communicative coupling. In some embodiments, the decrementing timer can be stopped when the indication is received of the communicative coupling between the devices 106, 110.

After the devices 106, 110 have been coupled, the process 800 proceeds to block 812, wherein an assessment data packet is delivered. In some embodiments, the assessment data packet can be retrieved from the database server 104 and/or from one of the databases of the database server 104 such as, for example, the evaluation database 308. In some embodiments, the assessment data packet can comprises a description of, for example, a task, one or several parameters of the tasks such as, descriptors of the action associated with the task, one or several descriptors of a timer or location of the task, or the like. In some embodiments, the assessment data packet can comprise one or several questions such as, for example, one or several self-assessment questions configured to generate data relating to the completion of the task such as, for example, the users confidence and/or comfort in completing the task. In some embodiments, the delivery of the assessment packet can include the receipt of a response to the assessment packet.

In some embodiments, the delivery of an assessment packet can include the generating and/or sending of a signal by the server 102 to the recipient user device 106 directing the generation of an assessment interface in the graphical user interface by the recipient I/O subsystem. In some embodiments, this assessment interface includes a plurality of user prompts and a plurality of user input regions.

After the assessment packet has been delivered, the process 800 proceeds to block 814, wherein one or several alerts are generated and/or sent. In some embodiments, these one or several alerts can be generated and/or sent by the server 102 in response to, for example, the incrementing timer exceeding, for example, a trigger value indicating a maximum allowable time for response to one or several data packets, for completion of a module, and/or for communicatively coupling of the devices 106, 110. In some embodiments, one or several alerts can be generated and sent if the decrementing timer reaches zero and/or a sufficiently large negative number before the communicative coupling of the devices 106, 110. In some embodiments, one or several alerts can be generated and sent if the assessment packet is not received and/or responded to in a desired time-frame and/or if the response to the assessment packet indicative an unsatisfactory response to the assessment packet.

In some embodiments, for example, the generation and the sending of one or several alerts can include the retrieval of one or several trigger values, also referred to herein as threshold values from the threshold database 310. In some embodiments, the one or several parameters relevant to the trigger value can be periodically compared to the trigger value. In some embodiments, an alarm can be triggered and then generated and sent when the one or more of the one or several parameters relevant to the trigger value exceeds the trigger value. In some embodiments, this can occur when the value of the incrementing timer exceeds the trigger value and/or when the value of the decrementing timer is less than the trigger value.

In some embodiments, one or several alerts can be generated and sent based on one or several electrical signals received from the recipient user device 106. In some embodiments, the supervisor device 110 can receive the alert from the content management server 102 and automatically provide alert data in user interpretable outputs via the supervisor I/O subsystem in response to receipt of the alert. In some embodiments, the alert data identifies the user associated with the alert and identifies a remedial action for resolving the cause of the alert. In some embodiments, the alert can be code such as computer code that can direct the supervisor device to provide an indicator of the received alert. In some embodiments, the indicator of the received alert can be one of: an aural indicator; a tactile indicator; and a visual indicator.

After the alert has been generated and sent, the process 800 proceeds to block 816, wherein user data is updated. In some embodiments, this can include updating the user data stored within the user profile database 301. In some embodiments, this update can identify, for example, progress through the module, response progress for one or several data packets, progress for one or several assessment packets, or the like. After the user data has been updated, the process 800 proceeds to decision state 818, wherein it is determined if the module identified in block 804 is now complete. If it is determined that the module is not complete, then the process 800 returns to block 806 and proceeds as outlined above. If it is determined that the module is complete, then the process 800 proceeds to block 820, wherein the user data is updated to indicate the completeness of the module.

Figure 9:
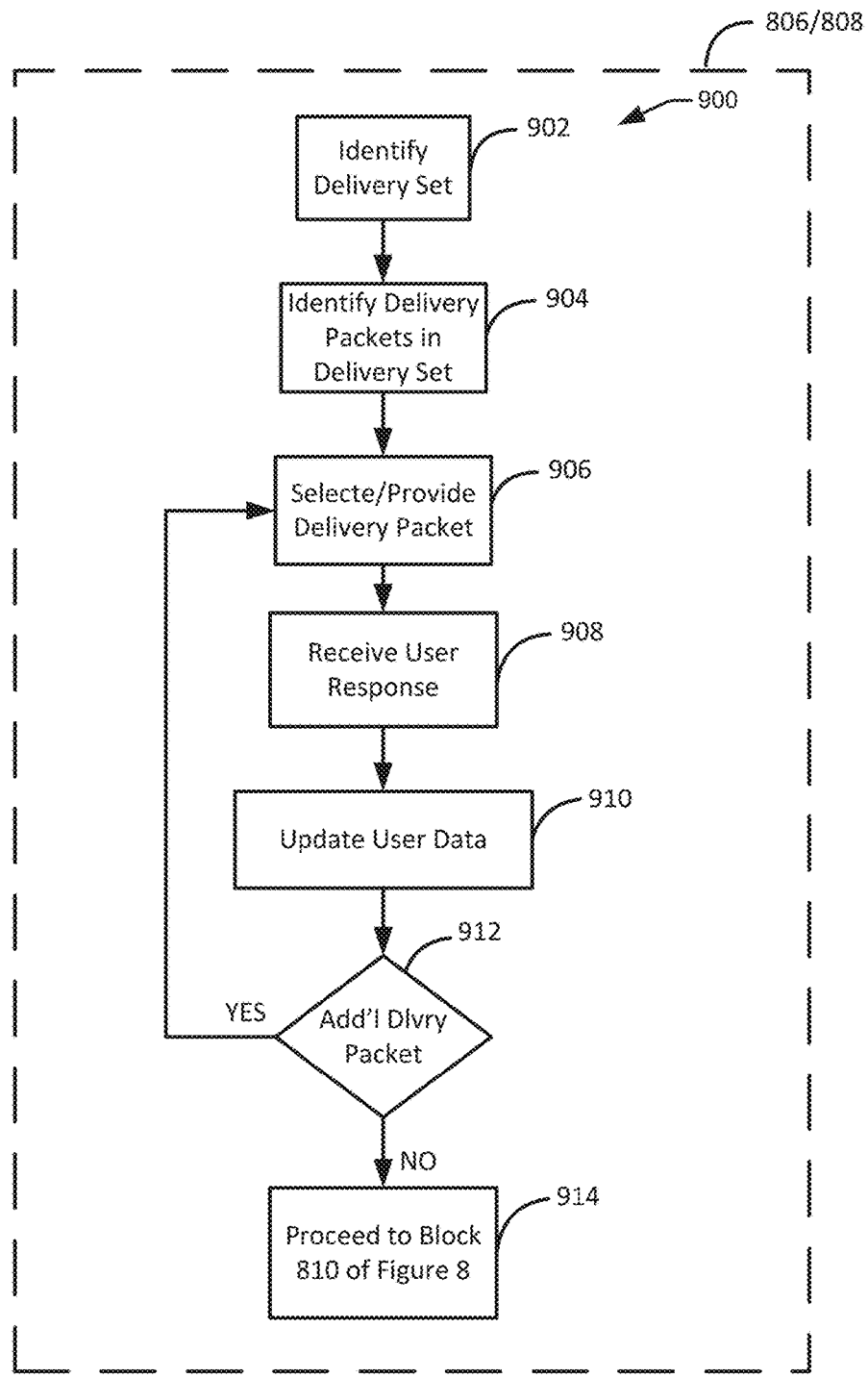
FIG. 9 is a flowchart illustrating one embodiment of a process for delivering one or several data packets.

With reference now to FIG. 9, a flowchart illustrating one embodiment of a process 900 for delivering one or several data packets is shown. The process 900 can be performed by the content distribution network 100, and specifically by some or all of the components of the content distribution network 100. In some embodiments, the process 900 can be performed in the place of, or as a part of blocks 806 and 808 of FIG. 8. The process 900 begins at block 902, wherein a delivery set is identified. In some embodiments, the delivery set can comprise the data packets of a module. In some embodiments, these data packets can be delivery data packets and/or assessment data packets. In some embodiments, the delivery set can be identified based on information stored in the database server 104, and specifically in the content library database 303 of the database server 104.

After the delivery set has been identified, the process 900 proceeds to block 904, wherein the data packets in the delivery set are identified. In some embodiments, this can include, for example, identification of the delivery packets in the delivery set. In some embodiments, this identification can be performed based on information stored in the content library database 303, which information can link data packets and modules.

After the data packets in the delivery set are identified, the process 900 proceeds to block 906, wherein one of the data packets in the delivery set is selected and delivered to the recipient user device 106. In some embodiments, this can include retrieving information relating to the data packets such as, for example, the difficulty of the data packet and/or retrieving information relating to the user such as, for example, one or several user attributes including, for example, the user skill level. In some embodiments, the data packets can be selected and provided to the recipient user device 106 in a predetermined order, and in some embodiments, the delivery order of the data packets can be customized based on, for example, the data relating to the user and/or to the data packets. In some embodiments, a value indicative of selection can be associated with each data packet as it is selected and/or delivered, and in some embodiments, the presentation interface can be updated to indicate receipt and/or completion of a data packet when the data packet is received at the recipient user device 106 and/or when the response to the data packet is provided by the recipient user device 106. In some embodiments, an incrementing timer can be started with the selection and/or delivery of the data packet.

After the data packet is selected and/or provided, the process 900 proceeds to block 908, wherein a response is received from the recipient user device 106 by the server 102. In some embodiments, this response can comprise an indication of the receipt of the data packet, one or several responses to questions and/or prompts in the data packet or associated with the data packet, or the like. In some embodiments, the incrementing timer can be stopped and/or reset with the receipt of the response from the recipient user device.

After the response has been received, the process 900 proceeds to block 910, wherein user data is updated. In some embodiments, the user data stored in the user profile database 301 can be updated with, for example, information contained in the response and/or based on the response. In some embodiments, this update to the user data can include identification of one or more received and/or completed data packets, an update to the user's skill level, or the like.

After the user data has been updated, the process 900 proceeds to decision state 912, wherein it is determined if there is an additional delivery packet. In some embodiments, this can include determining if all of the data packets in the delivery set have been provided to the user. If there are additional, un-provided data packets, then the process 900 returns to block 906 and proceeds as outlined above. If there are no additional data packets, then the process 900 continues to block 914, and proceeds to block 810 of FIG. 8.

Figure 10:
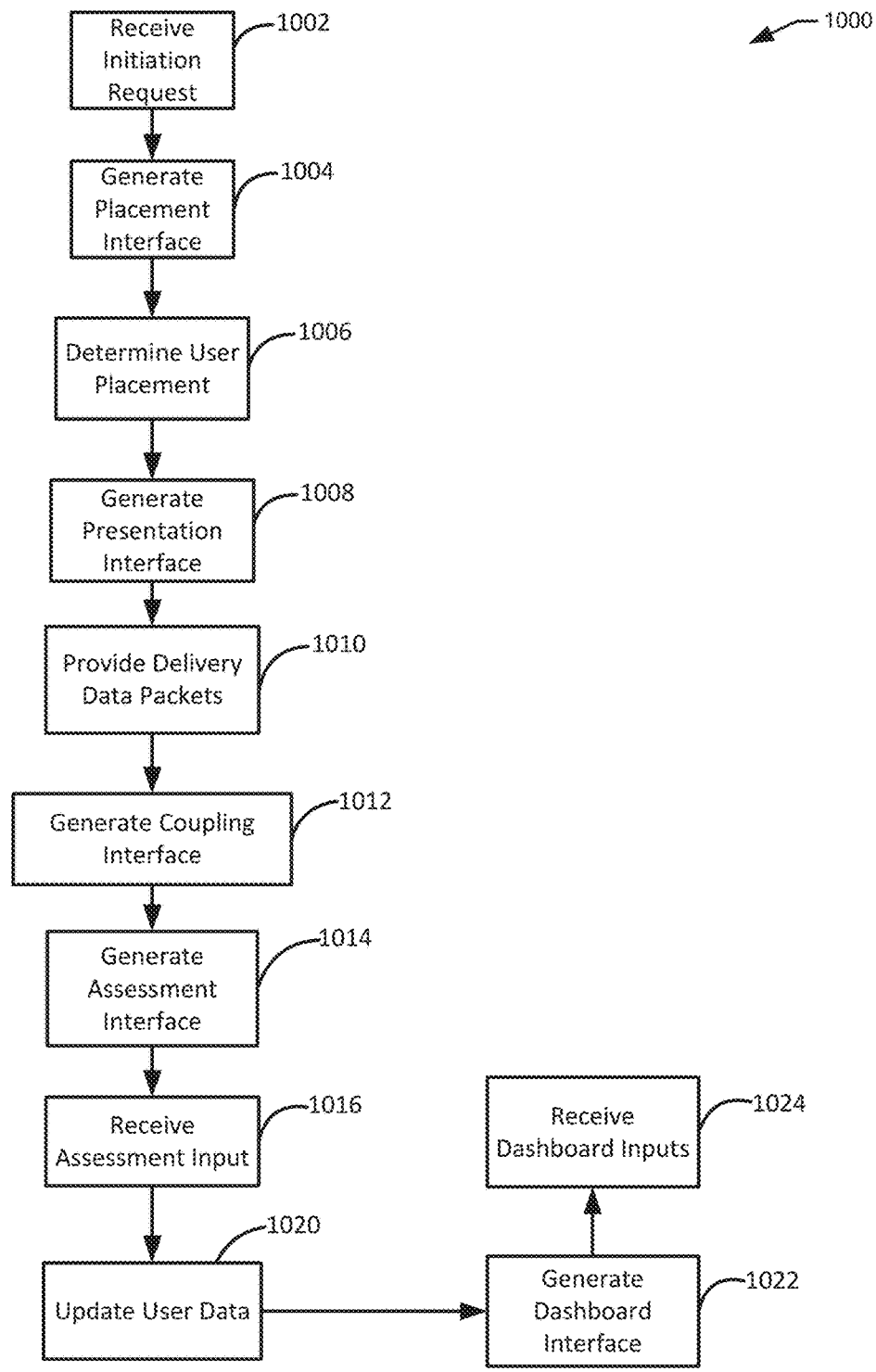
FIG. 10 is a flowchart illustrating one embodiment of a process for generating interfaces and alerts in response to a detected action of a recipient user device.

With reference now to FIG. 10, a flowchart illustrating one embodiment of a process 1000 for generating interfaces and alerts in response to a detected action of a recipient user device is shown. The process 1000 can be performed by the content distribution network 100, and specifically by some or all of the components of the content distribution network 100. The process 1000 begins at block 1002, wherein an initiation request is received. In some embodiments, the initiation request can be received from the recipient user device 106 by, for example, the content management server 102 via the communication network 120. The initiation request can comprise an electrical signal including a request for starting of a module, which module can be a group of data packets, tasks, and/or interactions.

After the initiation request has been received, the process 1000 proceeds to block 1004, wherein a placement interface is generated. In some embodiments, this can include the generating and sending of one or several electrical signals from the server 102 to the recipient user device 106 directing the recipient user device 106, and specifically directing the I/O subsystem of the recipient user device 106 to generate a placement interface in the graphical user interface. After receipt of the one or several electrical signals from the server 102 by the recipient user device 106, the recipient I/O subsystem can generate the placement interface. In some embodiments, the placement interface can comprise one or several windows or areas for questions or requests and/or one or several windows or areas for receiving one or several response from the user of the recipient user device 106.

After the placement interface has been generated, the process 1000 proceeds to block 1006, wherein the user placement is determined. In some embodiments, this can include the determination of one or several user attributes such as the user skill level. These one or several attributes can be determined via one or several user interactions with the placement interface and/or with content presented to the user via the placement interface. In some embodiments, these interactions between the user and the placement interface can result in the generation and sending of one or several electrical signals from the recipient user device 106 to the server 102, which one or several electrical signals can be evaluated to determine the one or several attributes of the user.

After the user placement has been determined, the process 1000 proceeds to block 1008, wherein a presentation interface is generated. Specifically, in some embodiments, the server 102 can generate and send one or several electrical signals directing the recipient user device 106, and particularly directing the I/O subsystem of the recipient user device 106, to generate a presentation interface.

Figure 11:
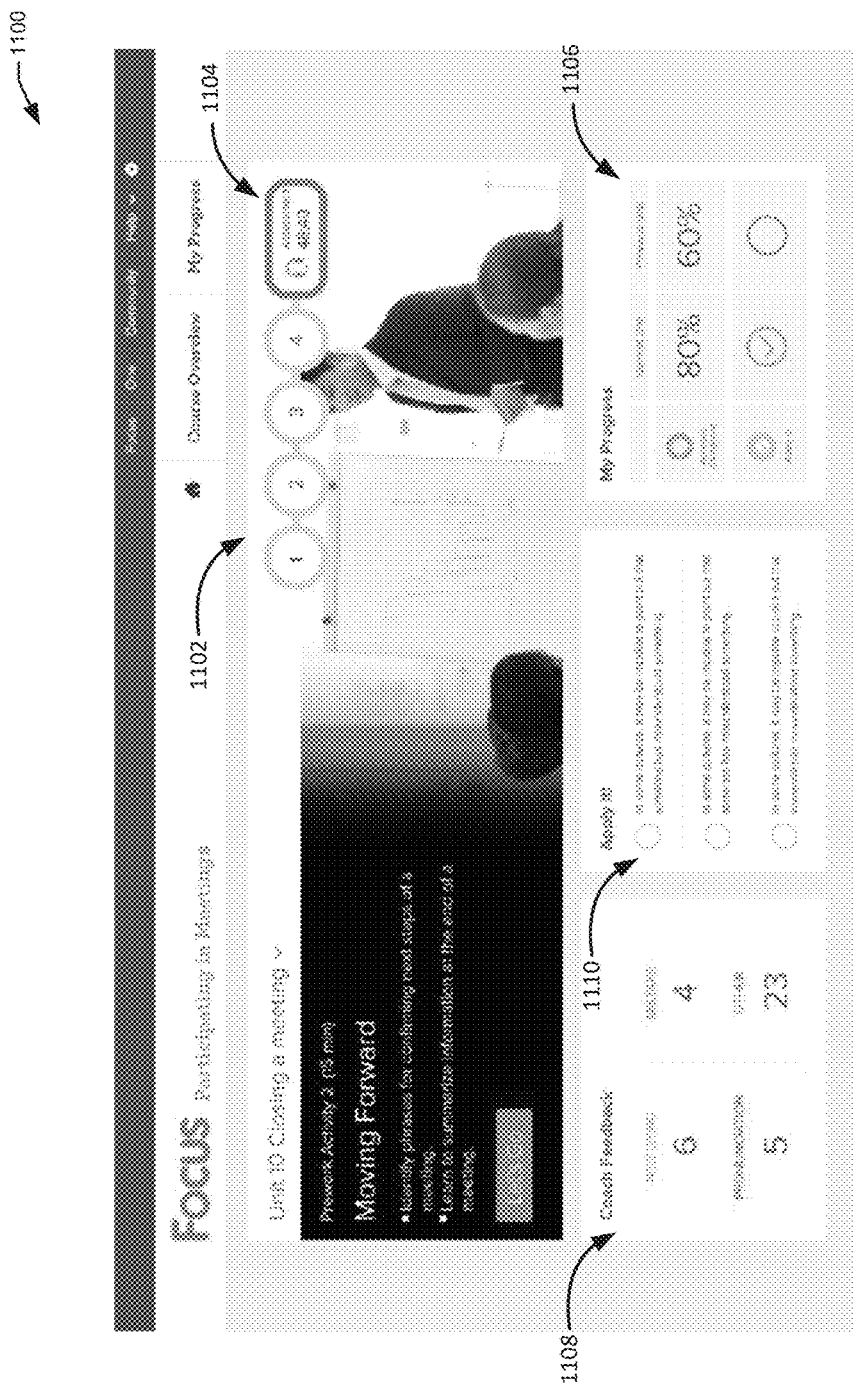
FIG. 11 depicts one embodiment of home page of a presentation interface.

In some embodiments, the presentation interface can include multiple pages such as, for example, a home page and a module page. With reference now to FIG. 11, one embodiment of home page 1100 of a presentation interface is shown. The home page 1100 can include a module progress tracker 1102 that can indicate a user' progress through a current module, and specifically the user's progress through a delivery set. The home page 1100 can include a coupling tracker 1104 including the decrementing timer. The coupling tracker 1104 can track completion of the coupling with the supervisor device 110 and/or the amount of time until the scheduled coupling. The home page 1100 can include a tracking region 1106 that can include information relating to the completion status, such as completion percent of one or several current or previous modules or delivery sets. In some embodiments, the home page 1100 can include a feedback region 1108 that can include feedback information relating to the communicative coupling. In some embodiments, the home page 1100 can include an assessment region 1110 that can include information relating to one or several assessment packets and/or user performance on one or several assessment packets.

Figure 12:
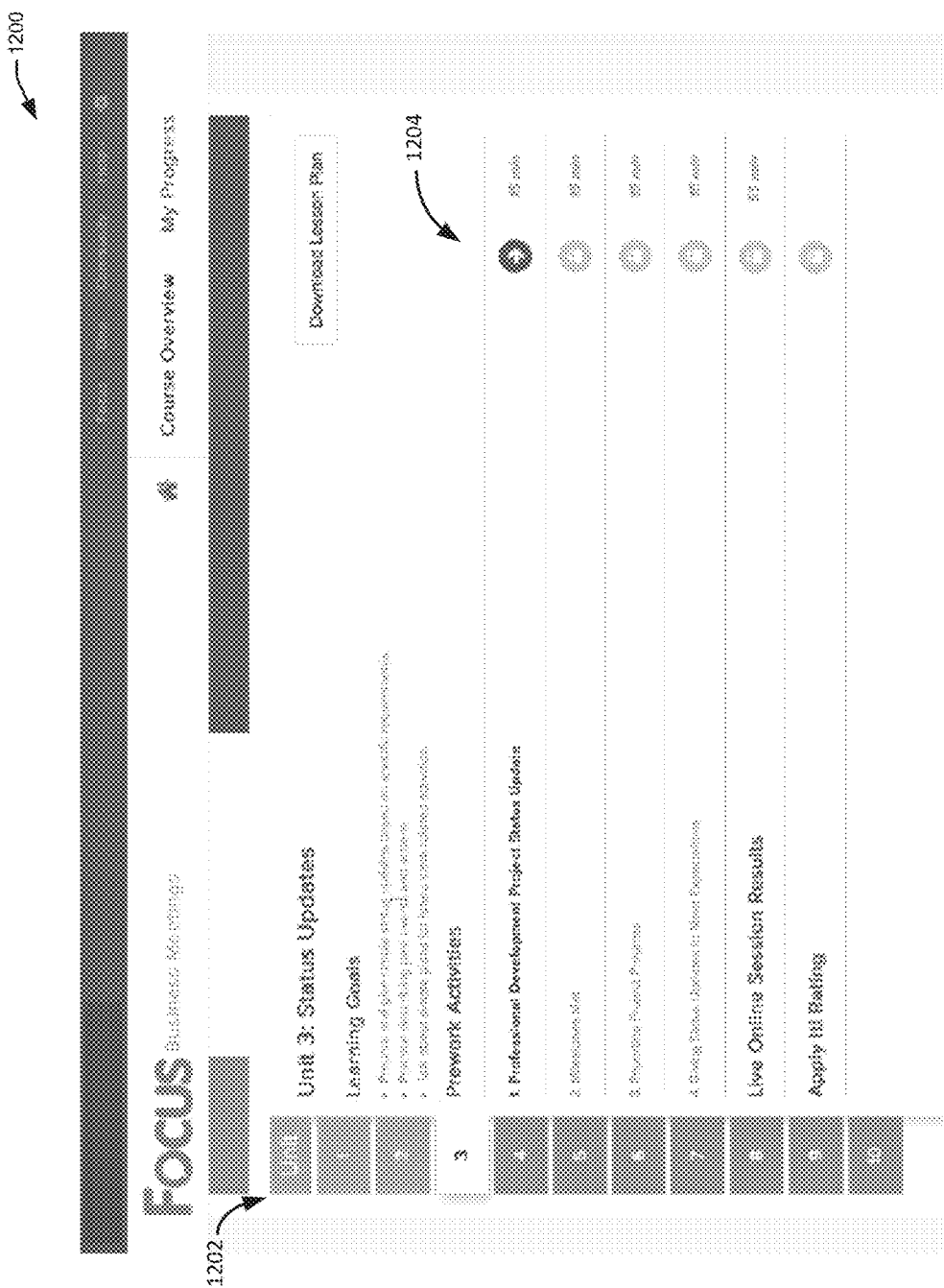
FIG. 12 depicts one embodiment of a module page of a presentation interface.

With reference now to FIG. 12, one embodiment of a module page 1200 of a presentation interface is shown. The module page can include a unit listing 1202 that can identify some or all of the units in a module. As used herein, a "unit" can include, one or several data packets such as delivery data packets and/or assessment data packets, communicative coupling, or the like.

In some embodiments, the unit listing 1202 can further include one or several visual indicators of the completion status of one or several of the units in the module. In some embodiments, this visual indicator can be a color of the unit listing, an icon, or the like. The module page 1200 can further include one or several start icons 1204. In some embodiments, the start icons can allow selection of one or several of the units. In some embodiments, the start icon can be a first start icon such as an arrow when a unit is available, or a second start icon such as a lock when a unit is unavailable.

After the presentation interface is generated, the process 10000 proceeds to block 1010, wherein one or several delivery data packets are provided to the user via the recipient user device 106 and/or the presentation interface. In some embodiments, these one or several delivery data packets can be selected and/or provided in accordance with process 900 of FIG. 9, or any of the steps of process 800 of FIG. 8.

After the delivery data packets have been provided, the process 1000 proceeds to block 1012, wherein the coupling interface is generated. In some embodiments, the generating of the coupling interface can include the server 102 generating and sending one or several electrical signals directing the recipient user device 106 and the supervisor device 110, and particularly directing the I/O subsystems of the recipient user device 106 and of the supervisor device 110, to generate a coupling interface. In some embodiments, the coupling interface can include one or several features configured to facilitate an interactive meeting between the user of the recipient user device 106 and the user of the supervisor device 110. In some embodiments, these features can include, for example, one or several windows or regions configured to show an image of the users such as, for example, a live image of the users, one or several windows or regions configured to show content such as content relating the interactive session, or the like.

Figure 13:
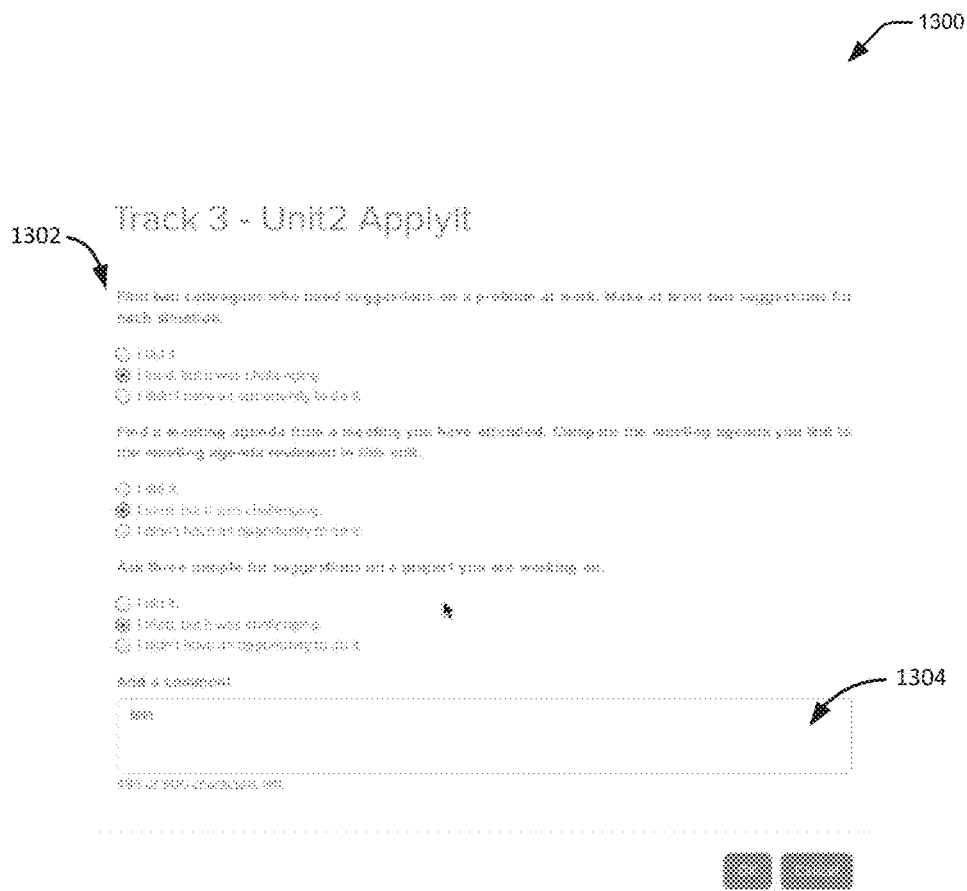
FIG. 13 depicts one embodiment of an assessment interface.

After the coupling interface has been generated, the process 1000 proceeds to block 1014, wherein the assessment interface is generated. In some embodiments, generating the assessment interface can include the generating and/or sending of a signal by the server 102 to the recipient user device 106 directing the generation of an assessment interface in the graphical user interface by the recipient I/O subsystem. In some embodiments, this assessment interface includes a plurality of user prompts and a plurality of user input regions. In some embodiments, the assessment interface can include a first portion identifying one or several tasks for completion as part of the assessment and a second portion configured to gather data relating to the completion of those one or several tasks. With reference now to FIG. 13, one embodiment of the assessment interface 1300 is shown. As depicted in FIG. 13, the assessment interface 1300 includes first portions 1302 prompting the user for an input and second portions 1304 in which the user can provide an input.

After the assessment interface has been generated, the process 1000 proceeds to block 1016, wherein an assessment input is received. In some embodiments, the assessment input can comprise the user provided inputs in the second portions 1304 of the assessment interface 1300. In some embodiments, these inputs can be a self-assessment of the user's performance in completion of the one or several tasks associated with the assessment interface 1300. In some embodiments, the assessment input can be received by the server 102 from the recipient user device 106 via the communications network 120.

After the assessment input has been received, the process 1000 proceeds to block 1020, wherein the user data is updated. In some embodiments, the user data can be updated to indicate the user's progress through the module and/or through one or several of the data packets and/or the communicative coupling. In some embodiments, the user data can be updated in the database server 104, and particularly in the user profile database 301.

After the user data has been updated, the process 1000 proceeds to block 1022, wherein a dashboard interface is generated. In some embodiments, generating the dashboard interface can include the generating and/or sending of a signal by the server 102 to the supervisor user device 110 directing the generation of the dashboard interface in the graphical user interface by the recipient I/O subsystem. In some embodiments, this dashboard interface includes information identifying one or several users and/or one or several user attributes such as progress through one or several selected modules.

Figure 14:
FIG. 14 depicts one embodiment of a dashboard interface.

With reference now to FIG. 14, one embodiment of the dashboard interface 1400 is shown. The dashboard interface 1400 includes a status bar 1402. The status bar 1402 identifies a group of users under the supervision of the user of the supervisor device 110 and the progress status of those users. In some embodiments, this progress status can include identifying onboarded users, users in progress, users requiring assistance or attention, and/or the total number of users.

The dashboard interface 1400 can further include a listing 1404 of one or several users. The listing 1404 can include a column, that can be entitled "subscribers," that can include an identifier of each of the users, and/or a column, that can be entitled "status," that can include an icon indicating a user status such as onboarded, in progress, or attention required. The listing 1404 can include other columns including a column entitled "start date" identifying a start date for a user, a column entitled "level" identifying a skill level of the user, a column entitled "course" identifying a module of a user, and/or a column entitled "schedule" identifying whether a time for communicative coupling of the recipient user device 106 and the supervisor device 110 is scheduled.

After the dashboard interface 1400 has been generated, the process 1000 proceeds to block 1024, wherein one or several dashboard inputs are received. In some embodiments, these one or several inputs can include, for example, the selection of one or several users for an intervention, special action, or the like. In some embodiments, the one or several dashboard inputs can be received by the server 102 from the supervisor device 110.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for triggering generation of an alert for delivery to a remote device, the system comprising:
   memory comprising:
      a user profile database comprising information identifying one or several attributes of a recipient user; and
      a content library database comprising a plurality of content items including a plurality of data packets for providing to the recipient user, wherein the data packets comprise: a plurality of delivery data packets; and a plurality of assessment data packets, the plurality of assessment data packets being associated with a plurality of assessment questions;
   a recipient user device comprising:
      a network interface configured to exchange data via a communication network; and
      a recipient I/O subsystem configured to convert electrical signals to user interpretable outputs, wherein the recipient I/O subsystem is configured to generate a graphical user interface according to received data;
   a supervisor device comprising:
      a network interface configured to exchange data via the communication network; and
      a supervisor I/O subsystem configured to convert electrical signals to user interpretable outputs user interface, wherein the supervisor I/O subsystem is configured to generate a graphical user interface according to received data;
   a content management server, wherein the content management server is configured to:
      direct the generation of a placement interface in the graphical user interface by the recipient I/O subsystem;
      direct the generation of a presentation interface in the graphical user interface by the recipient I/O subsystem, wherein the presentation interface is configured to implement a delivery sequence, wherein the delivery sequence comprises:
         delivering a set of content items for presentation to the recipient user device, wherein the set of content items comprise a subset of the plurality of content items stored in the content library database; and
         delivering at least one assessment question from the plurality of assessment questions for delivery to the user of the recipient user device to the recipient user device;
      direct the generation of a coupling interface at each of the recipient user device and the supervisor device by:
         causing the recipient user device to display a first window configured to depict a first image of a user of the supervisor device, and causing the supervisor device to display a second window configured to depict a second image of a user of the recipient user device; and generate and send an alert to the recipient user device and the supervisor device based on one or several electrical signals received from the recipient user device.

2. The system of claim 1, wherein the supervisor device is configured to receive the alert from the content management server and automatically provide alert data in user interpretable outputs via the I/O subsystem in response to receipt of the alert.

3. The system of claim 2, wherein the alert data identifies the user associated with the alert and identifies a remedial action for resolving the cause of the alert.

4. The system of claim 2, wherein the content management server is configured to:

trigger an incrementing timer;

compare the incrementing timer to a trigger value; and generate and send the alert when the incrementing timer exceeds the trigger value.

5. The system of claim 4, wherein the content management server is configured to communicatively couple the recipient user device and the supervisor device.

6. The system of claim 5, wherein communicatively coupling the recipient user device and the supervisor device comprises:

automatically sending a proposed time for communicatively coupling of the recipient user device and the supervisor device to the recipient user device;

receiving an acceptance signal of the proposed time for communicatively coupling the recipient user device and the supervisor device from the recipient user device; and triggering a decrementing timer based on the receipt of the acceptance signal and the amount of time until the proposed time for communicatively coupling the recipient user device and the supervisor device.

7. The system of claim 6, wherein communicatively coupling the recipient user device and the supervisor device further comprises receiving an indication of data transmission between the recipient user device and the supervisor device, wherein the indication comprises a signal from at least one of the recipient user device and the supervisor device indicating communicative coupling.

8. The system of claim 6, wherein the content management server is further configured to direct generation of a dashboard interface in the graphical user interface by the supervisor I/O subsystem.

9. The system of claim 8, wherein the content management server is further configured to send information for updating the dashboard interface, wherein the information indicates the communicative coupling of the recipient user device and the supervisor device.

10. The system of claim 9, wherein the content management server is further configured to direct generation of an assessment interface in the graphical user interface by the recipient I/O subsystem, wherein the assessment interface includes a plurality of user prompts and a plurality of user input regions.

11. The system of claim 10, wherein the content management server is further configured to send the assessment data packet to the recipient user device.

12. A method for triggering an alert for delivery to a remote device, the method comprising:

generating and sending an electrical signal directing generation of a placement interface in a graphical user interface of a recipient user device by a recipient I/O subsystem;

generating and sending an electrical signal directing the generation of a presentation interface in the graphical user interface of the recipient user device by the recipient I/O subsystem, wherein the presentation interface is configured to implement a delivery sequence, wherein the delivery sequence comprises:

delivering a set of content items for presentation to a user of the recipient user device, wherein the set of content items comprise a subset of a plurality of content items stored in a content library database; and delivering at least one assessment question for delivery to the user of the recipient user device to the recipient user device, wherein the at least one assessment question is selected from a plurality of assessment questions stored in the content library database;

generating and sending an electrical signal directing the generation of a coupling interface at each of the recipient user device and a supervisor device by:

causing the recipient user device to display a first window configured to depict a first image of a user of the supervisor device, and causing the supervisor device to display a second window configured to depict a second image of a user of the recipient user device; and generating and sending an alert to the recipient user device and to the supervisor device based on one or several electrical signals received from the recipient user device.

13. The method of claim 12, further comprising receiving the alert from the content management server at the supervisor device and automatically providing alert data in user interpretable outputs via the I/O subsystem in response to receipt of the alert.

14. The method of claim 13, wherein the alert data identifies the user associated with the alert and identifies a remedial action for resolving the cause of the alert.

15. The method of claim 11, further comprising:

triggering an incrementing timer;

comparing the incrementing timer to a trigger value; and generating and sending the alert when the incrementing timer exceeds the trigger value.

16. The method of claim 15, further comprising:

automatically sending a proposed time for communicatively coupling of the recipient user device and the supervisor device to the recipient user device;

receiving an acceptance signal of the proposed time for communicatively coupling the recipient user device and the supervisor device from the recipient user device; and triggering a decrementing timer based on the receipt of the acceptance signal and the amount of time until the proposed time for communicatively coupling the recipient user device and the supervisor device.

17. The method of claim 16, further comprising receiving an indication of data transmission between the recipient user device and the supervisor device, wherein the indication comprises a signal from at least one of the recipient user device and the supervisor device indicating communicative coupling.

18. The method of claim 17, further comprising directing generation of an assessment interface in the graphical user interface by the recipient I/O subsystem, wherein the assessment interface includes a plurality of user prompts and a plurality of user input regions.

19. The method of claim 18, further comprising sending the assessment data packet to the recipient user device.

* * * * *